(12) United States Patent
Garneau, Sr.

(10) Patent No.: US 6,421,921 B1
(45) Date of Patent: Jul. 23, 2002

(54) ATTACHABLE AND REMOVABLE HANDLE FOR FOOD SERVING UTENSILS

(75) Inventor: John P. Garneau, Sr., Lighthouse Point, FL (US)

(73) Assignee: Safe Food Systems, Inc., Lighthouse Point, FL (US)

(*) Notice: Subject to any disclaimer, the term of this patent is extended or adjusted under 35 U.S.C. 154(b) by 0 days.

(21) Appl. No.: 09/494,604

(22) Filed: Jan. 31, 2000

Related U.S. Application Data

(63) Continuation of application No. 08/935,569, filed on Aug. 4, 1997, now Pat. No. 6,115,921, and a continuation-in-part of application No. PCT/US96/12811, filed on Aug. 1, 1996, which is a continuation-in-part of application No. 08/511,374, filed on Aug. 4, 1995, now Pat. No. 5,699,614.

(60) Provisional application No. 60/003,526, filed on Sep. 11, 1995, and provisional application No. 60/007,332, filed on Nov. 6, 1995.

(51) Int. Cl.⁷ .............................................. A47J 43/28
(52) U.S. Cl. ........................... 30/150; 30/142; 30/322; 294/99.2
(58) Field of Search ................... 30/150, 142, 322, 30/324; 294/99.2

(56) References Cited

U.S. PATENT DOCUMENTS

| 986,761 | A | | 3/1911 | Roscoe | |
|---|---|---|---|---|---|
| 1,106,809 | A | | 8/1914 | Haverty et al. | |
| 1,775,571 | A | * | 9/1930 | Romer | 30/150 |
| 1,823,152 | A | | 9/1931 | Larson | |
| 2,254,571 | A | | 9/1941 | Hailey | 16/116 |
| 2,262,273 | A | | 11/1941 | Ferrara | 294/31 |
| 2,275,875 | A | | 3/1942 | Werfel | 16/114 |
| 2,377,953 | A | | 6/1945 | Matton | 16/114 R |
| 2,670,234 | A | | 2/1954 | Roop | 30/150 X |
| 2,853,780 | A | | 9/1958 | Bull | 30/327 |
| D196,133 | S | | 8/1963 | Brown | 30/37 |
| 3,186,088 | A | | 6/1965 | Lingenfelter | 30/340 X |
| 3,815,175 | A | | 6/1974 | Szabados | 16/114 |
| 3,858,320 | A | | 1/1975 | Neal et al. | 30/326 X |
| 4,646,405 | A | | 3/1987 | Reinhold | 30/329 |
| 4,779,344 | A | | 10/1988 | Panisch | 30/326 |
| 4,782,555 | A | | 11/1988 | Fischhbach | 16/110 |
| 4,794,666 | A | | 1/1989 | Kim | 16/114 |
| 4,826,033 | A | | 5/1989 | Ratoh | 30/324 X |
| 4,926,522 | A | | 5/1990 | Wang | 16/114 |
| 4,965,907 | A | | 10/1990 | Baumgarten | 16/114 |
| 4,967,446 | A | * | 11/1990 | Padel | 294/99.2 X |
| 5,054,835 | A | * | 10/1991 | Loechel et al. | 30/150 X |
| 5,131,151 | A | | 7/1992 | Agase et al. | 30/327 |
| 5,251,758 | A | | 10/1993 | Kolacek | 206/542 |
| 5,479,708 | A | | 1/1996 | Thomas | 30/322 X |

FOREIGN PATENT DOCUMENTS

| FR | 1152001 | 5/1956 | 30/327 |
|---|---|---|---|
| FR | 1151001 | 1/1958 | 30/327 |

OTHER PUBLICATIONS

Copy of Official Gazette p. 1096 dated Dec. 22, 1959 for U.S. Design Patent No. 186,927, entitled "Covered Food Serving Table".

* cited by examiner

*Primary Examiner*—Douglas D. Watts
(74) *Attorney, Agent, or Firm*—Webb Ziesenheim Logsdon Orkin & Hanson, P.C.

(57) ABSTRACT

A utensil having a first portion and a handle. The first portion includes a utensil portion, which can be spoon shaped, forked shaped, knife shaped or other food implement shaped and a shank attached at one end to the utensil portion. The handle is removably attached to another end of the shank. A spring loaded clamp is provided with the handle to coact with the shank so as to engage the shank with the handle. The utensil is particularly well adapted to be used with buffets, whereby first portions of utensils are provided with buffet dishes and handles are provided for the customers of the buffet. A clip can be provided for attaching to a buffet dish and holding the utensil first portion.

3 Claims, 21 Drawing Sheets

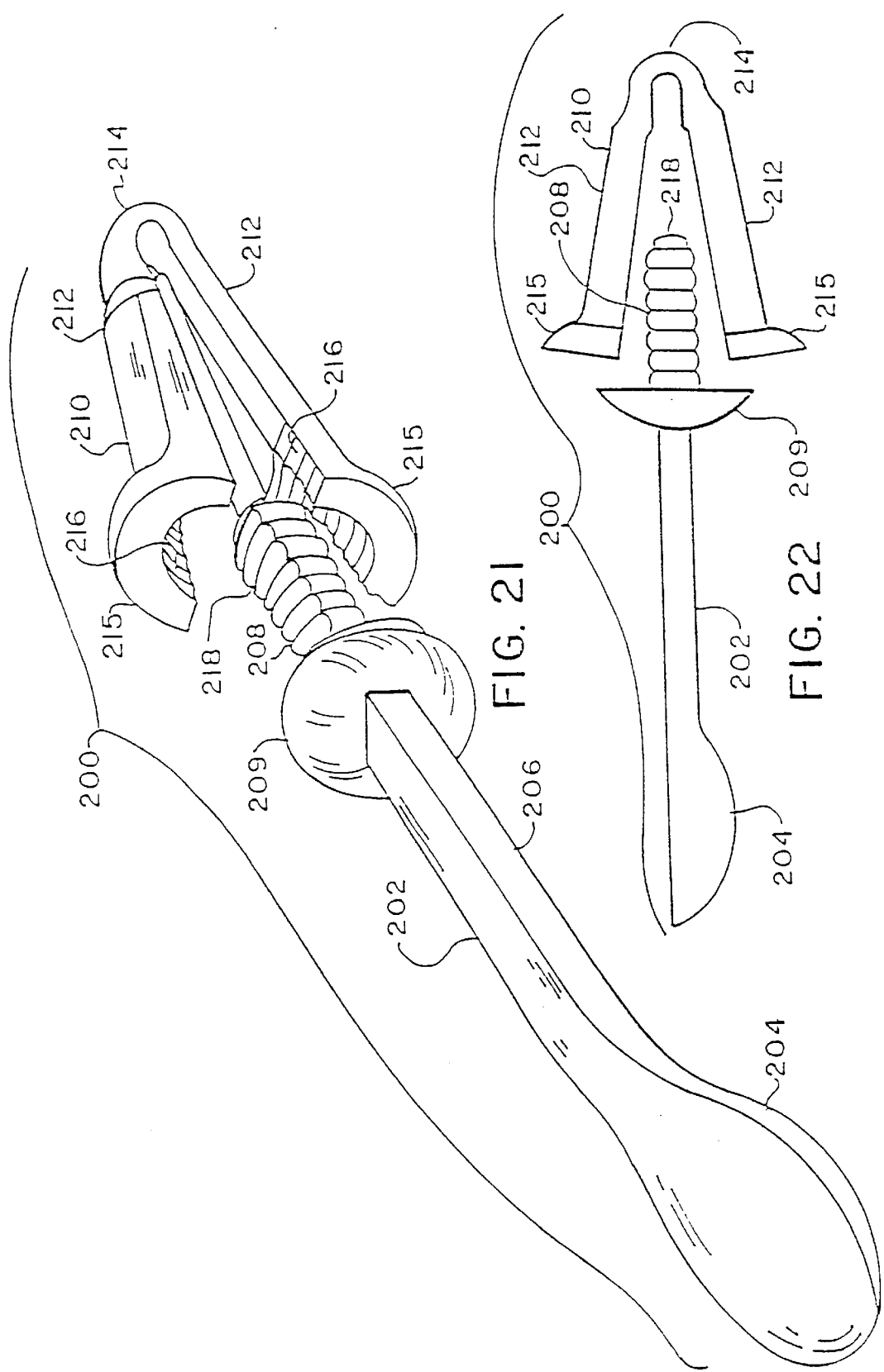

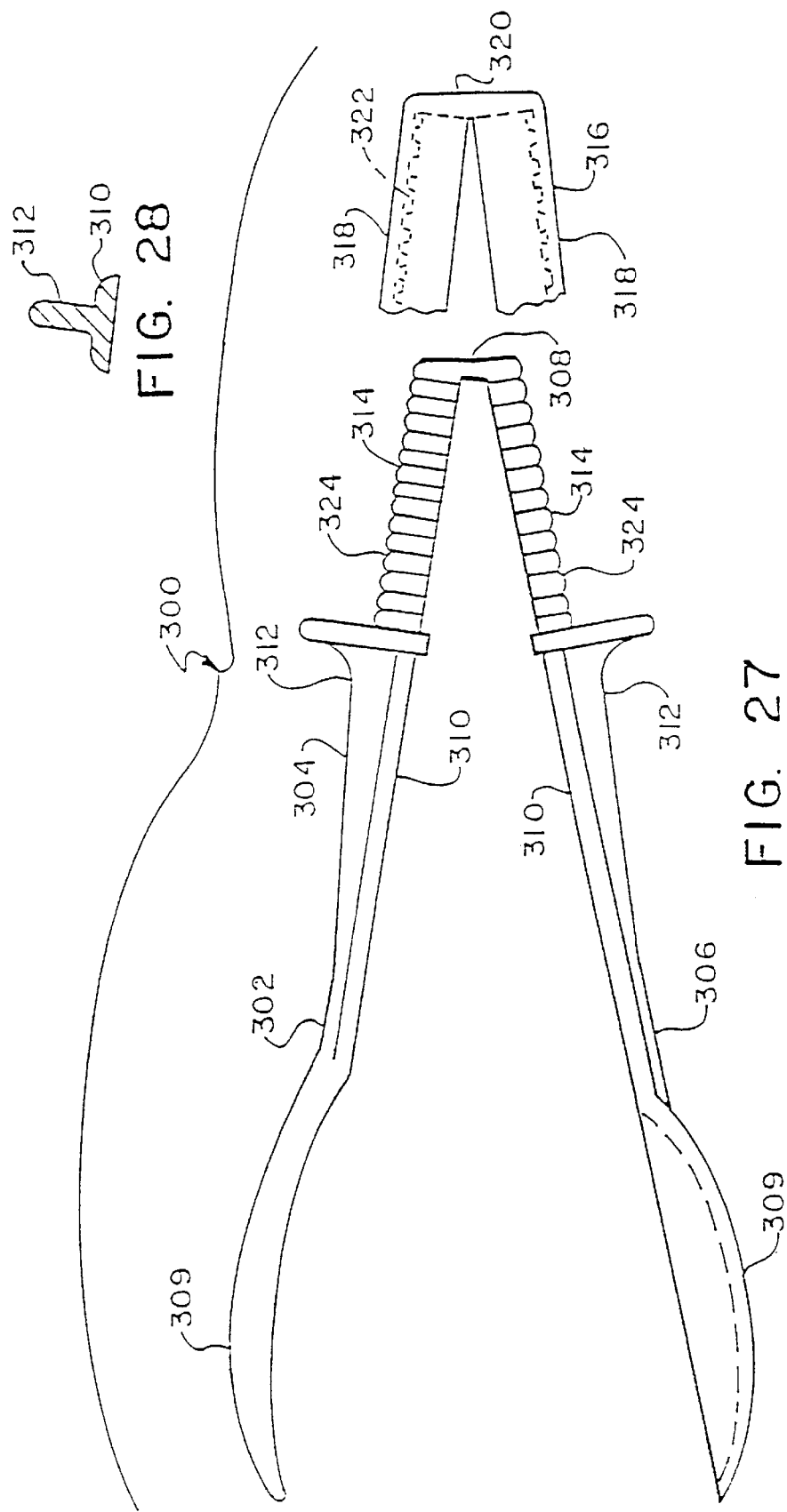

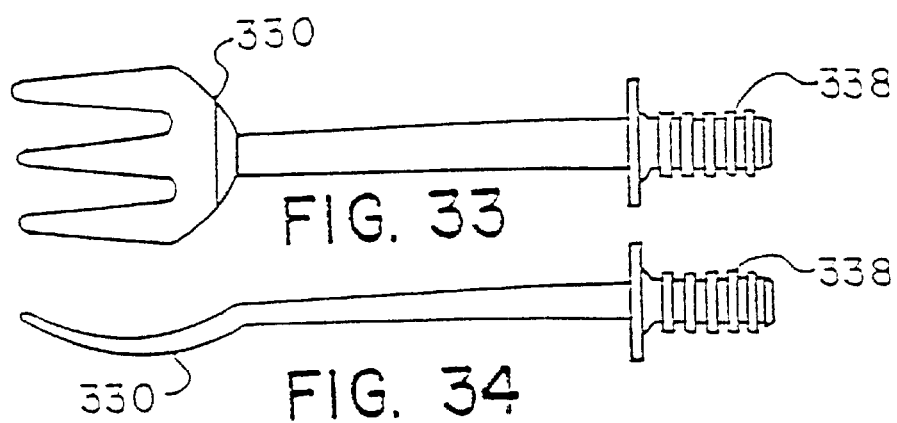
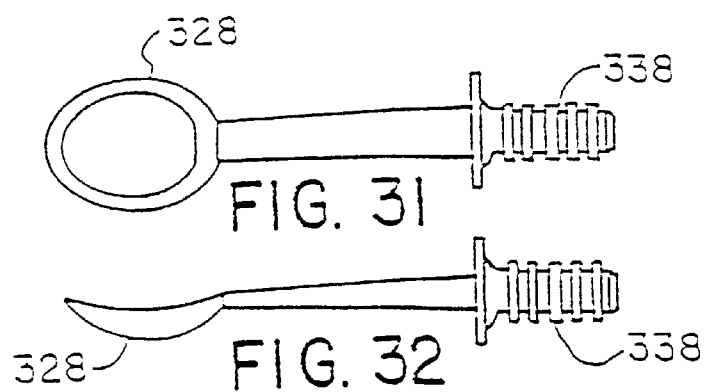
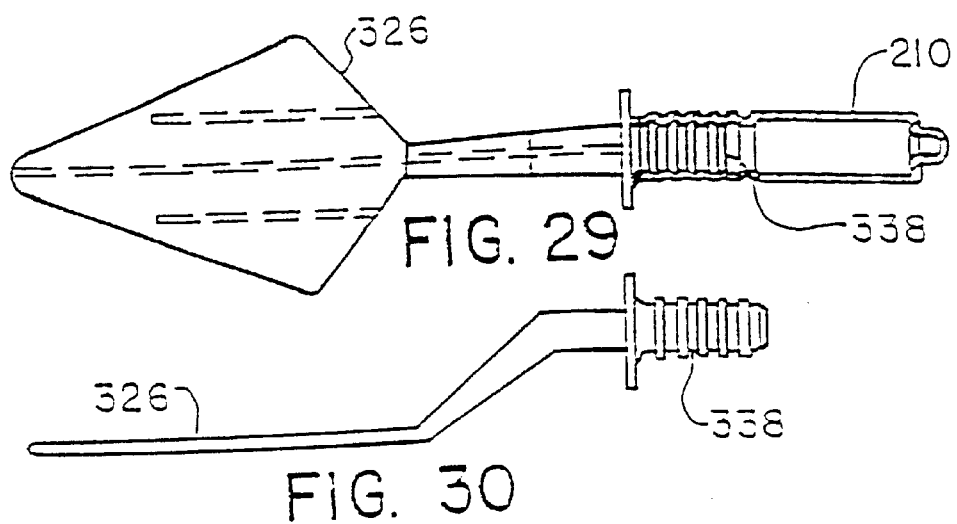

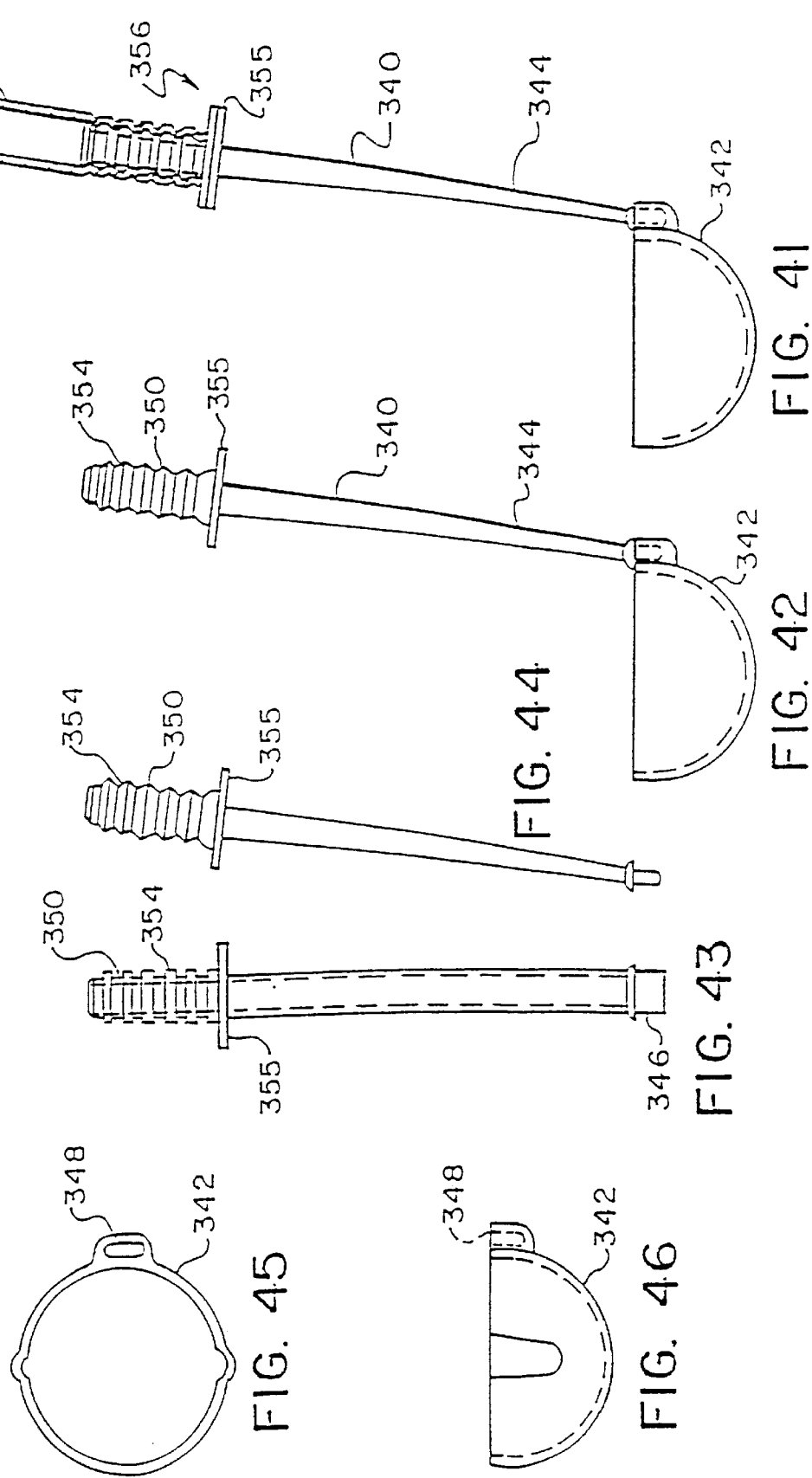

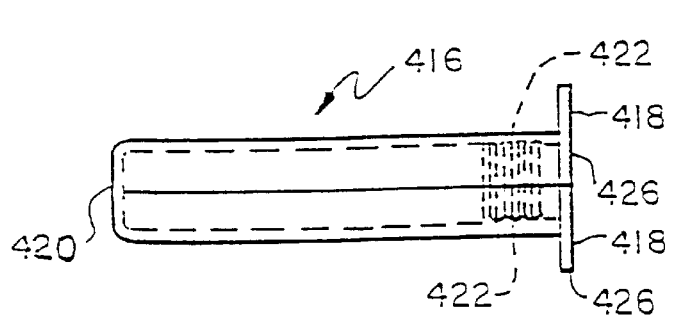
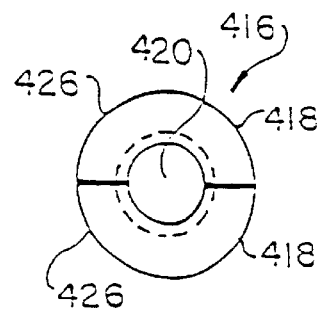
FIG. 51
FIG. 52
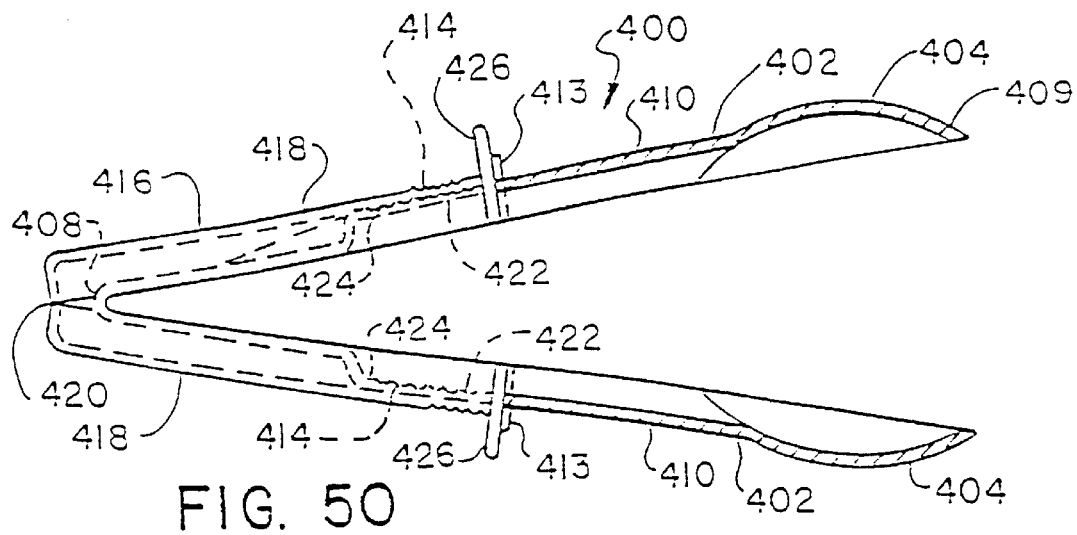
FIG. 50
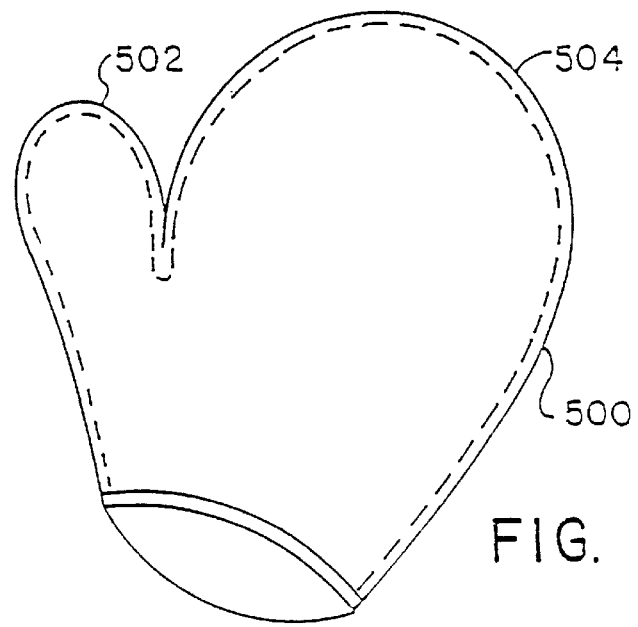
FIG. 53

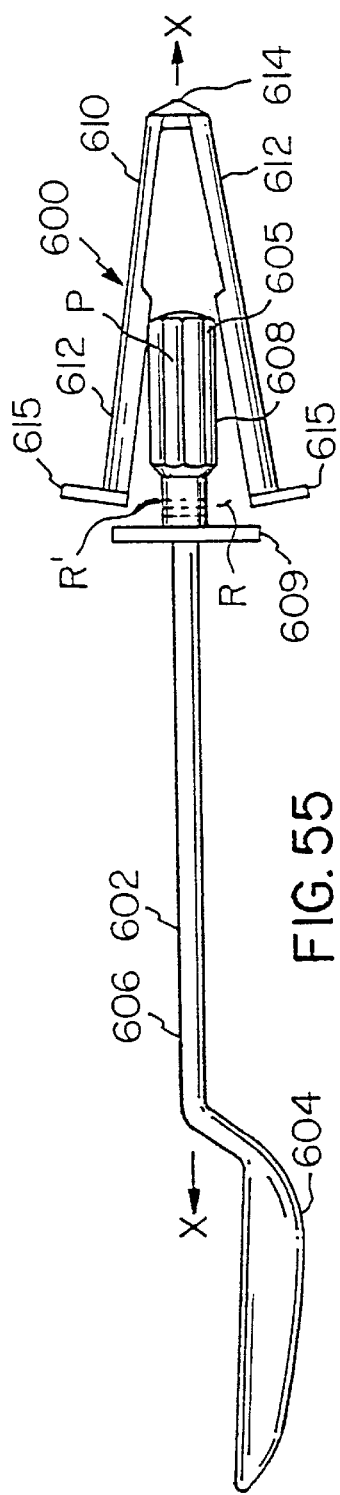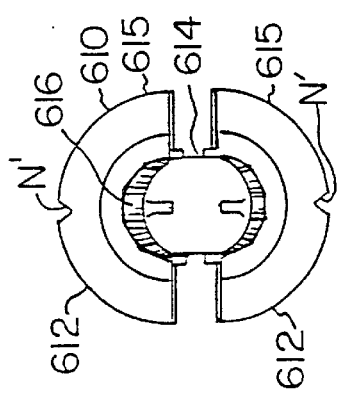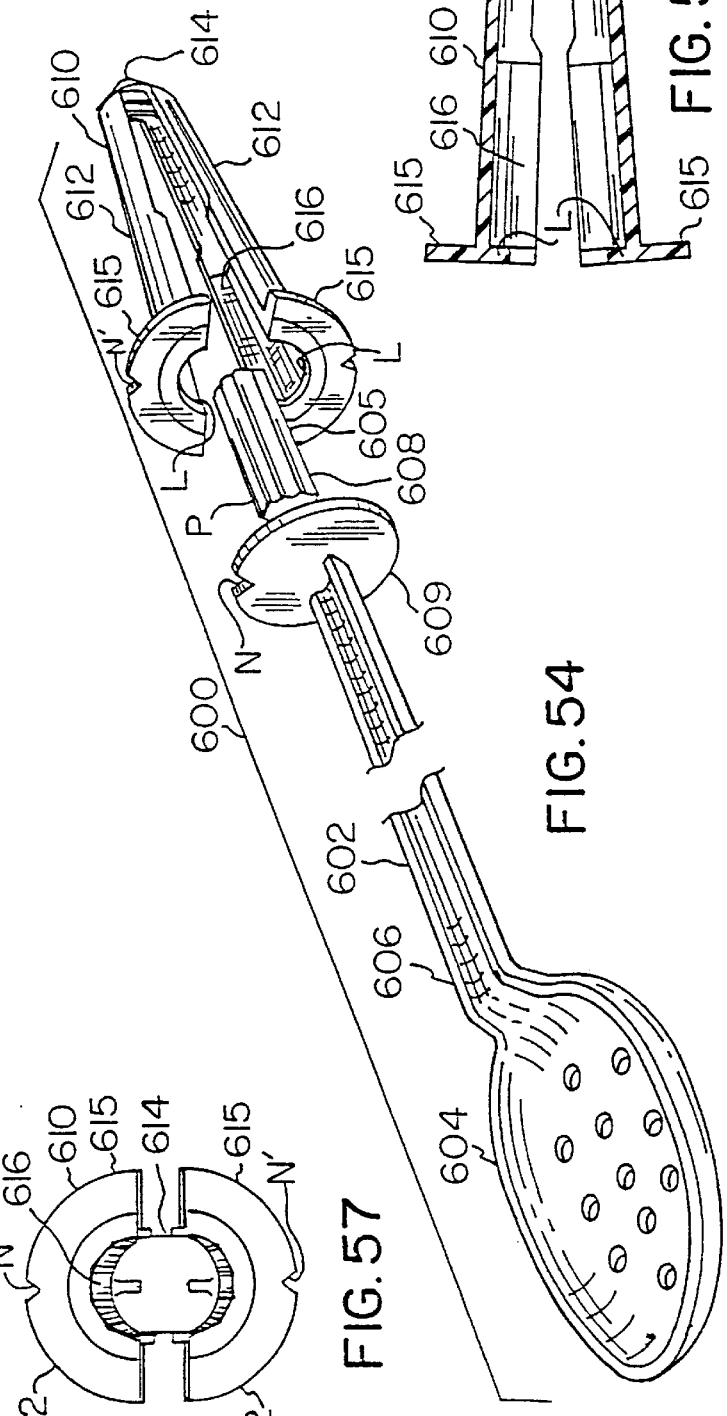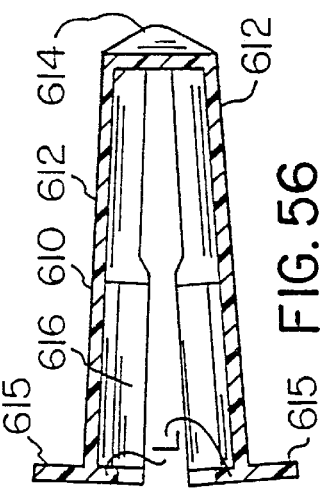

ATTACHABLE AND REMOVABLE HANDLE FOR FOOD SERVING UTENSILS

CROSS REFERENCE TO RELATED APPLICATIONS

This application is a continuation-in-part of International Application No. PCT/US96/12811, filed Aug. 1, 1996, which is a continuation-in-part of U.S. patent application Ser. No. 08/511,374, filed Aug. 4, 1995, now U.S. Pat. No. 5,699,614, and claims the benefit of U.S. Provisional Patent Application Serial No. 60/003,526, filed Sep. 11, 1995, and U.S. Provisional Patent Application Serial No. 60/007,332, filed Nov. 6, 1995. This application is a continuation of Ser. No. 08/935,569 filed Aug. 4, 1995, now U.S. Pat. No. 6,115,921.

BACKGROUND OF THE INVENTION

1. Field of the Invention

This invention relates to food serving utensils, and more particularly, food utensils for use with food buffets.

2. Description of the Prior Art

During the past twenty years, Americans have seen the increase of both spouses entering the work force. This has resulted in an increase in spendable income for the family. This increase in income permits the family to enjoy such luxuries as two cars, color televisions and luxurious vacations. Also, Americans, in general, are spending more time away from home for both work and pleasure. As a result, more people are eating their meals in restaurants.

Buffets are one of the most popular forms of restaurants. Buffets typically include many different types of appetizers, salads, entrees and desserts placed in food trays along a buffet table.

Spoons or forks are generally provided with each buffet dish. The customer or patron uses the utensils to remove as much food as he or she desires from the buffet dish onto their plate and then places the utensils back into the buffet dish. The patron continues this process throughout the buffet table, and then goes to his or her seat to eat the food using food utensils provided by the restaurant.

Sanitation has always been a concern of buffet restaurant owners, as well as the restaurant customers. Restaurant owners are well aware of the economical and devastating effect that results from an outbreak of food poisoning in a restaurant.

Great progress has been made in mandating the supervision of food preparation and employees personal hygiene within the restaurant industry in order to safeguard the future of the dining out segment of the food service industry. However, this is not good enough, since customer cross-contamination is also possible in the buffet environment by various customers using the same buffet food utensils and breathing onto the buffet food.

The food service industry specifically addressed the latter concern by including buffet sneeze guards over the buffet tables (see for example, Applicant's U.S. Design Pat. No. 186,927). However, the cross-contamination of customers has never been addressed. It is known that Streptococcal, *E. coli* and Staph bacteria congregate on human hands and may be passed among customers using the same utensils. Also, Hepatitis A may likewise be passed among customers in the same manner. Furthermore, the bacteria and virus also can contact the food, thereby contaminating the food.

To overcome this cross-contamination problem, it has been proposed to issue disposable gloves to buffet customers. However, use of such gloves has been rejected for several reasons, namely: (1) the patron's resentment of the inference that they have unclean hands; (2) the unwillingness of the patron to wear disposable gloves; (3) the inconvenience of putting on and removing the gloves while holding a plate of food, plus the awkward appearance of everyone wearing gloves; and (4) the gloves are easily contaminated by touching other items, thereby giving the wearer a false sense of security.

It has also been suggested that the patron be issued his or her own utensils for use only with the buffet dishes. However, this would require an inordinate number of serving utensils and is, therefore, not practical. Likewise, it has been suggested that a sanitation box be provided for use with the buffet utensils before removing food from the buffet dishes. This too is impractical and would be tremendously confusing to the customer.

Therefore, it is an object of my invention to provide a simple, effective, efficient, aesthetically pleasing and inexpensive solution to prevent customer cross-contamination of buffet utensils.

SUMMARY OF THE INVENTION

My invention is a buffet utensil that includes a utensil portion (such as a spoon, fork, knife or other food implement shape) secured to an end of a shank. A coupling, such as a splined coupling, is provided at the other end of the shank. A handle is provided having an open end and defining a cavity adapted to matingly receive the coupling. A spring loaded clamp is provided on the handle to engage the shank.

The handle is adapted to be removably secured to the shank. Initially, the clamp is maintained in an open position and matingly receives the splined coupling within the cavity. The clamp is then maintained in a closed position thereby removably securing the handle to the shank. The above process is reversed to disengage the handle from or engaging the shank.

In the buffet setting, each buffet dish includes a first portion of the utensil, which includes the utensil portion and the shank. Before starting down the buffet table, each customer is issued their own detachable handle which easily clamps onto all of the serving utensils already on the buffet table. The detachable handle stays with the customer for his or her entire trip around the buffet table. This customer is the only person who touches the handle as he or she serves themselves from the buffet table. The customer engages the handle with the shank as described above for only those utensil first portions contained within buffet dishes he or she desires food from. The customer places the food on their plate and then disengages the handle from the shank.

After filling their plate with food from the buffet table, the customer simply disposes of the handle.

The handles can then be taken to the dish washing department where they are properly washed, sanitized and returned to the dining room for reuse.

Should the customer desire to return to the buffet and for additional food, then he or she would use another detachable handle.

A clip or holding member can be provided to hold the first portion of the utensil.

BRIEF DESCRIPTION OF THE DRAWINGS

FIG. 21 is a top perspective, partially exploded view of another embodiment of a food serving utensil having a removable handle and a utensil first portion made in accordance with the present invention;

FIG. 22 is a side, partially exploded view of the food serving utensil shown in FIG. 21;

FIG. 27 is a side, partially exploded view of a portion of a food serving utensil having a removable handle and a utensil first portion made in accordance with another embodiment of the present invention;

FIG. 28 is a sectional view of a structural rib of a shank of the utensil first portion shown in FIG. 27;

FIG. 29 is a plan view partially in section of a food serving utensil having a removable handle and a utensil first portion made in accordance with another embodiment of the present invention;

FIG. 30 is a side elevational view of the utensil first portion shown in FIG. 29;

FIG. 31 is a top plan view of another utensil first portion made in accordance with the present invention;

FIG. 32 is a side elevational view of the utensil first portion shown in FIG. 31;

FIG. 33 is a top elevational view of another utensil first portion made in accordance with the present invention;

FIG. 34 is a side elevational view of the utensil first portion shown in FIG. 33;

FIG. 41 is a side elevational view partially in section of a food serving utensil having a removable handle and a utensil first portion made in accordance with another embodiment of the present invention;

FIG. 42 is a side elevational view of the food serving portion of the utensil first portion shown in FIG. 41;

FIG. 43 is a top plan view of a shank of the utensil first portion shown in FIG. 42;

FIG. 44 is a side elevational view of the shank shown in FIG. 43;

FIG. 45 is a top plan view of a utensil portion of the food serving utensil shown in FIG. 42;

FIG. 46 is a side elevational view of the utensil portion shown in FIG. 45;

FIG. 50 is a side elevational view partially in section of the food serving utensil shown in FIG. 47 in an open position;

FIG. 51 is a side elevational view of the handle shown in FIG. 47;

FIG. 52 is a front elevational view of the handle shown in FIG. 51;

FIG. 53 is a perspective view of a mitt made in accordance with the present invention;

FIG. 54 is a top perspective, partially exploded view of another embodiment of a food service utensil having a removable handle and a utensil first portion made in accordance with the present invention;

FIG. 55 is a side, partially exploded view of the food serving utensil shown in FIG. 54;

FIG. 56 is a sectional view of the removable handle shown in FIG. 54;

FIG. 57 is a front elevational view of the handle shown in FIGS. 54–56; and

DETAILED DESCRIPTION OF THE INVENTION

Figure 1:
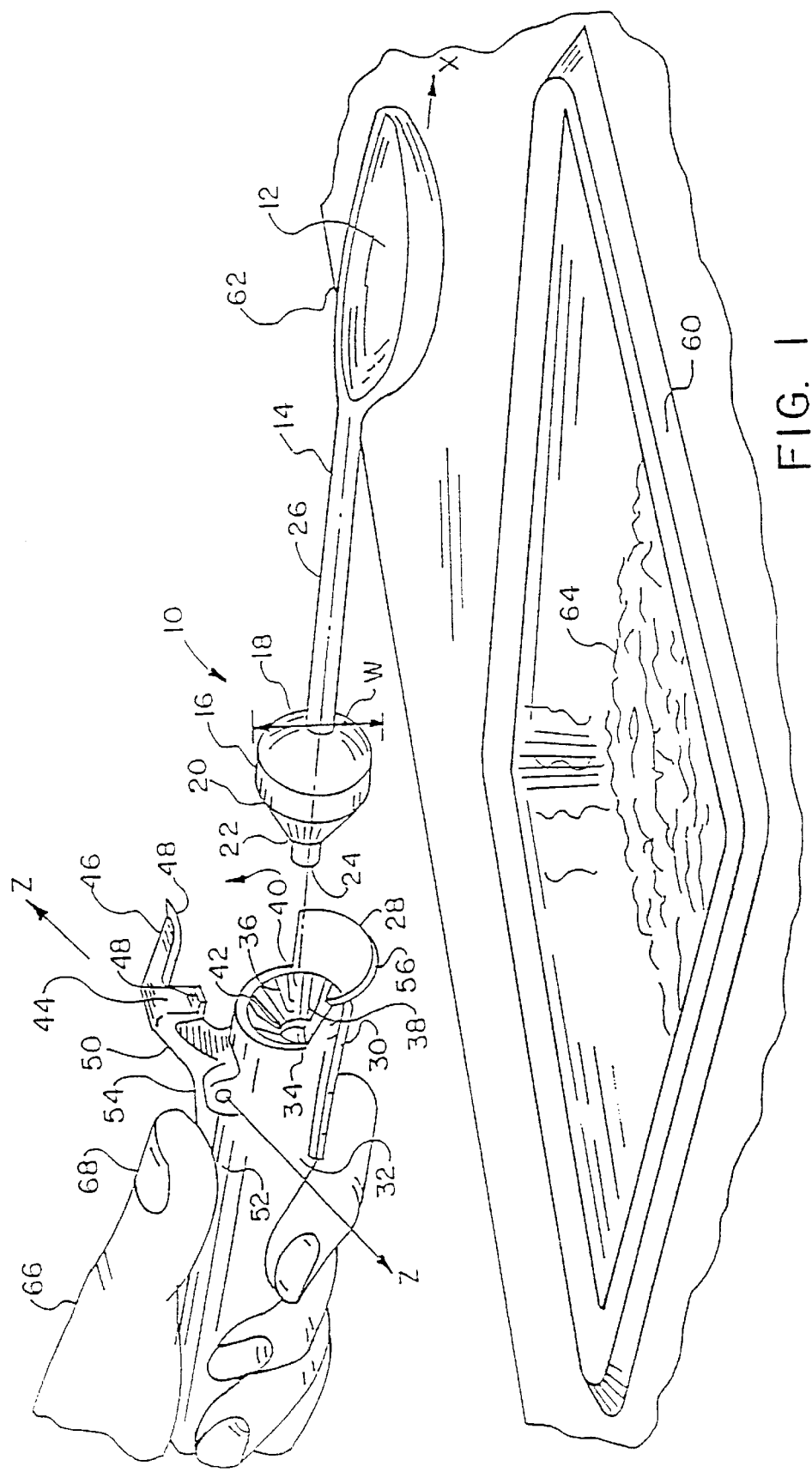
FIG. 1 is a perspective, partially exploded view of a food serving utensil having a removable handle for serving utensils made in accordance with the present invention.
Figure 2:
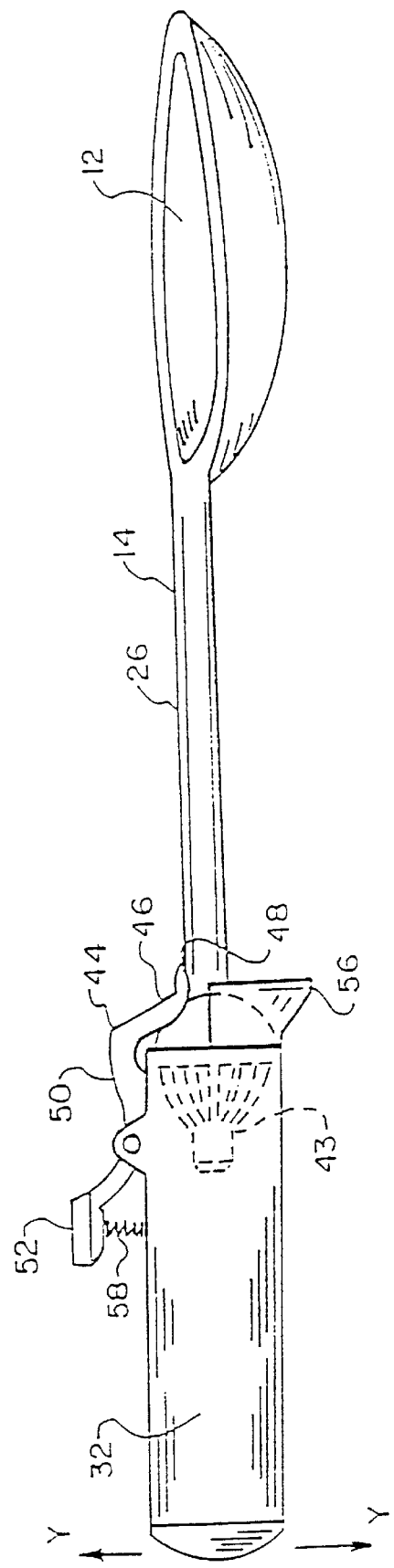
FIG. 2 is a side view of the food serving utensil shown in FIG. 1.
Figure 3:
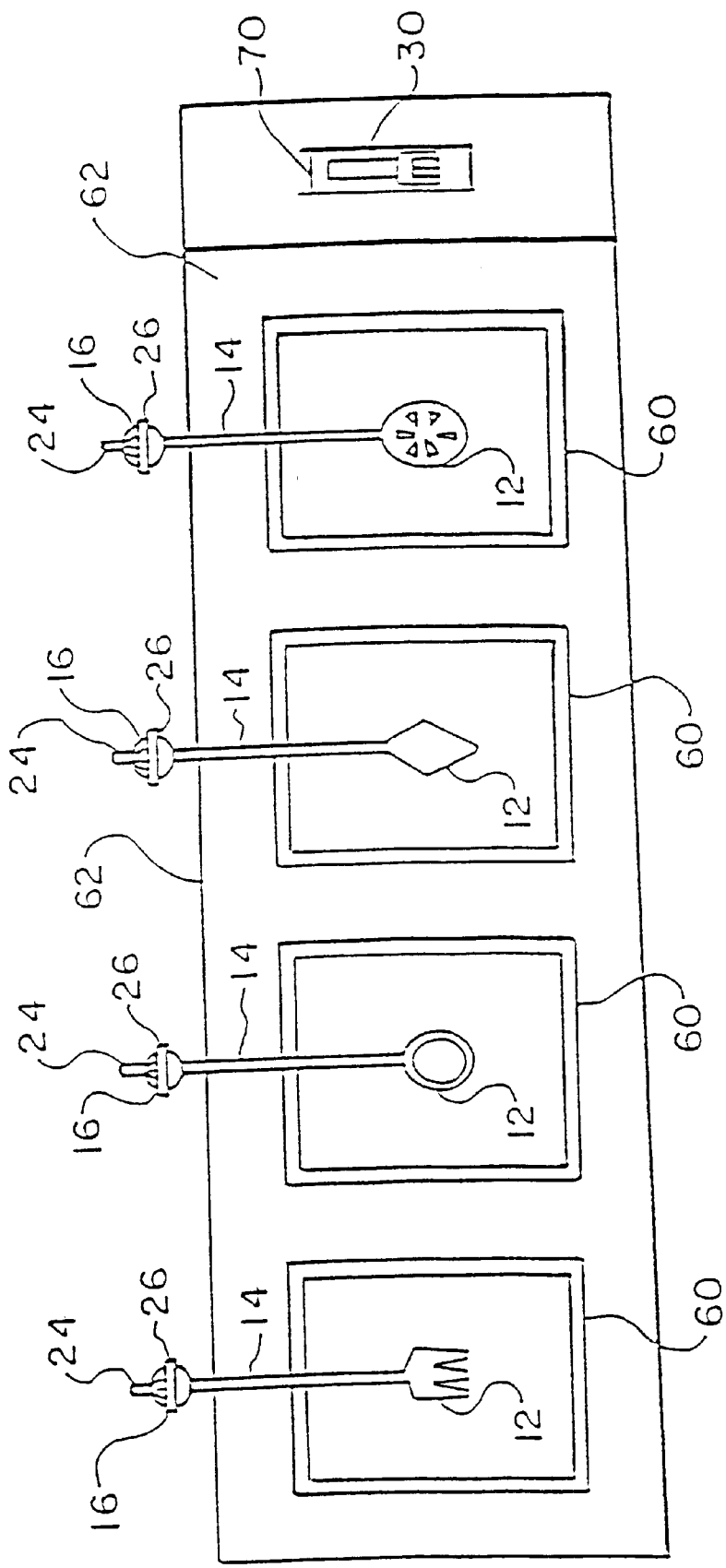
FIG. 3 is a top plan view of a buffet table having a plurality of first portions of food serving utensils made in accordance with the present invention.

FIGS. 1 and 2 show a food serving utensil 10 made in accordance with the present invention. Utensil 10 includes a spoon shaped utensil portion 12 attached to one end of a shank 14. The utensil portion 12 can be spoon shaped, knife shaped, fork shaped or any other utensil shape, as shown in FIG. 3. A splined coupling 16 is included at the other end of the shank 14. The splined coupling 16 includes a frustoconical smooth surface 18 at the end closest to the utensil portion 12 and a serrated frusto-conical shaped surface 20 at the other end. The surface 20 is defined by a plurality of longitudinally extending teeth 22.

A centering pin 24 extends rearwardly from the surface 20. Splined coupling 16 and centering pin 24 form a male member. The utensil portion 12, the shank 14, the splined coupling 16 and the centering pin 24 form a first portion 26 of the utensil 10. Preferably, the first portion 26 should be made of stainless steel, although other materials can be used.

A second portion 28 of utensil 10 defines a handle 30. The handle includes a handle grip 32 having an open end 34. A splined surface 36 defines a cavity 38 adapted to receive the splined coupling 16 and the centering pin 24. Cavity 38 is defined by a tapered serrated surface 40 defined by a plurality of longitudinally extending teeth 42 terminating at a cylindrical surface 43. A female member of the handle 30 is defined by the portion that includes cavity 38.

A spring loaded clamp 44 is pivotally secured to the handle grip 32. The clamp 44 includes a forked end 46 defined by two spaced apart tines 48 secured to a clamp body 50. The tines 48 form a V-shaped recess. A lever actuator button 52 is secured on an opposite end of the body 50. Two spaced apart lugs 54 extend from the handle grip 32. Aligned holes are provided in the lugs 54 and the body 50 through which a pivot pin passes through so that the clamp 44 is pivotally secured to the handle grip 32. In this arrangement, the forked end 46 is positioned over a flared receiving lip 56, which is positioned forwardly of the cavity 38. A spring 58 is secured to both the lever actuator button 52 and the handle grip 32 so as to spring bias or urge the forked end 46 toward the flared receiving lip 56. Pushing the lever actuator button 52 toward the handle grip 32 causes the body 50 to pivot about the pivot pin, thereby moving the forked end 46 away from the flared receiving lip 56, as shown in FIG. 1. The spring 58 causes the forked end 46 to move toward the lip 56 when the button 52 is released, as shown in FIG. 2.

In operation, each customer is issued a handle 30. Each buffet dish 60 on a buffet table 62 is provided with its own serving utensil first portion 26, which is typically placed within the food 64 contained in the dish 60, as shown in FIG. 3. The handle 30 remains with the customer during their entire trip along the buffet table 62. When the customer reaches a dish 60 and desires to take some of the food from it, he or she grabs the handle 30 with their hand 66 and depresses the button 52 with their thumb 68. This causes the forked end 46 to move away from the lip 56 and places the clamp 44 in an open position. The distance of the tine ends and the lip 56 is greater than the width W of the splined coupling 16 when the clamp 44 is in the open position. The handle 30 is then moved by the customer towards the coupling 16 so that it is received within the cavity 38. The button 52 is released and the clamp 44 and the forked end 46 is urged downwardly by the spring 58 so that lower surfaces of tines 48 contact surface 18, placing the clamp 44 in a closed position and causing the surface 20 and the pin 24 to matingly engage with surfaces 40 and 43. The pin 24 and surface 43 center the utensil portion 12 about the longitudinal "X" axis, as well as prevent the pin from rotating about the "Y" and "Z" axes. The mating serrated surfaces 20 and 40 prevent the utensil portion from rotating about the longitudinal "X" axis and the tines 48, which are positioned on opposite sides of the shank 14 and prevent the first portion 26 from sliding out of the handle 30.

The customer then serves himself or herself food 64 by removing the food 64 from the dish 60 and placing the food 64 onto his or her plate in a normal manner (that is by using the utensil portion 12). The customer then places the utensil portion 12 into dish 60, rests the shank 14 against an upper edge of the dish 60, and then depresses the button 52 as described above, thereby placing the clamp 44 in an open position and moving the handle 30 away from the first portion 26, so that the handle 30 can be removed or disengaged from the first portion 26.

The customer continues this process along the buffet table 62 for each dish (which the restaurant has placed food in) using the same handle provided to them. After filling his or her plate with food from the buffet table 62, the customer deposits the handle into a container 70 or gives it to a restaurant employee and returns to their table to enjoy their food. The handles 30 are then washed and sanitized and can be returned to the dining room for reuse. Should the customer wish to return to the buffet table, a new handle 30 can be given to him or her and the above process is repeated. Alternatively, the handles or first portions could be made disposable out of such materials as plastic.

As should be evident, at no time has there been any cross-contamination of the serving utensils or food on the buffet table 62 because only one customer has touched the handle 30 with his or her own hands prior to the handle being washed and sanitized. Hence, this arrangement is a single, effective, aesthetically pleasing and inexpensive solution to prevent cross-contamination of buffet utensils. Further, the restaurant can purchase the first portions 26 and handles 30 as sets or individually, since it is conceivable that more handles 30 would be required by a restaurant, than first portions 26. Also, the male member can be provided on the handle 30 and the female member could be defined on the first portion 26.

Figure 4:
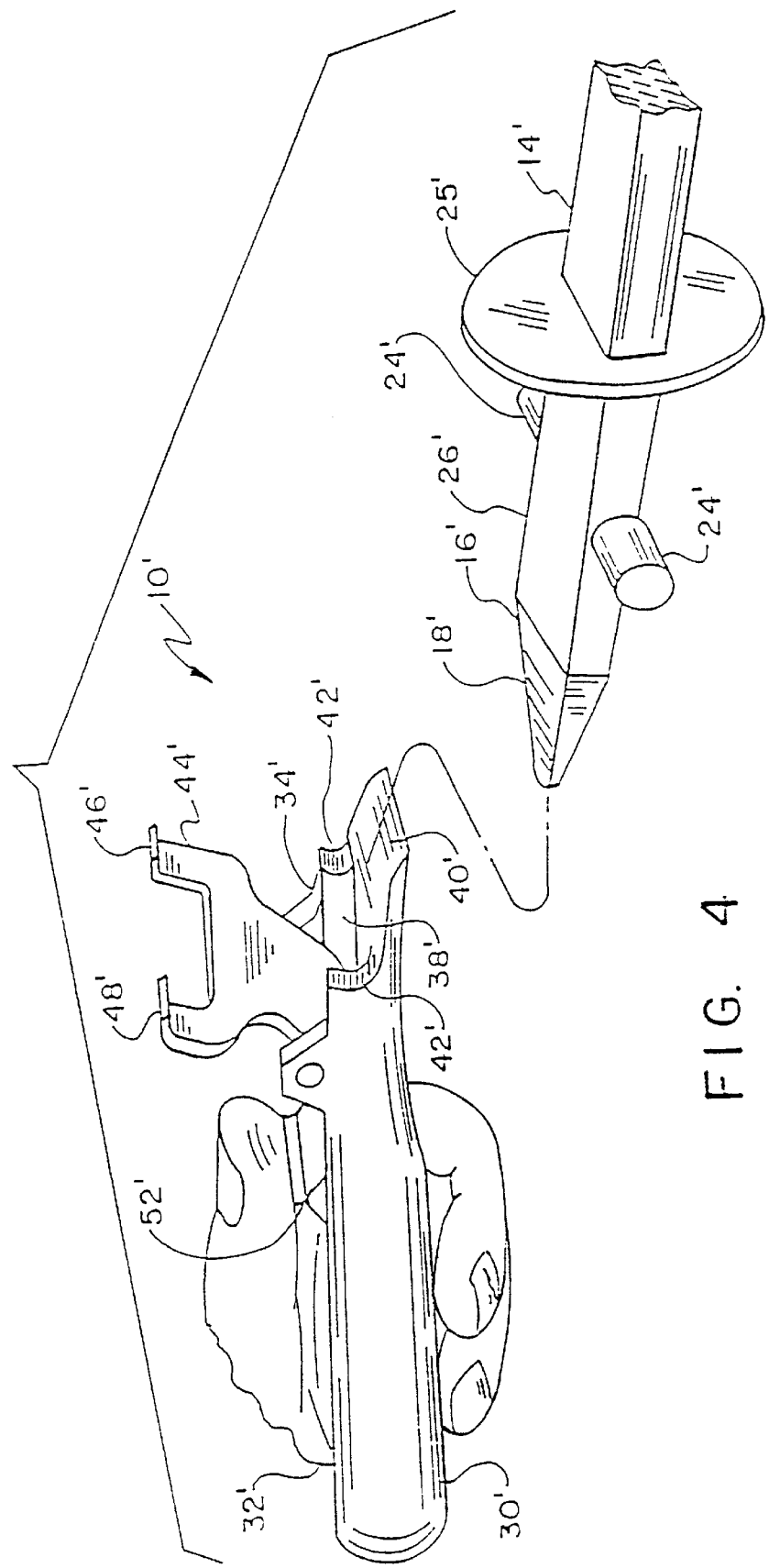
FIG. 4 is an exploded view of a portion of another food serving utensil made in accordance with the present invention.
Figure 5:
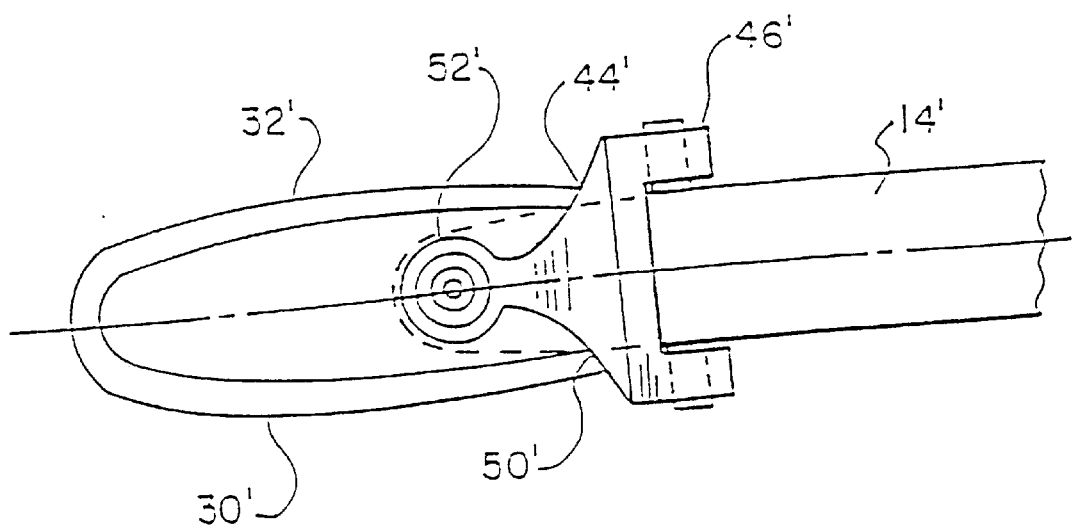
FIG. 5 is a top view of a portion of the food serving utensil shown in FIG. 4.
Figure 6:
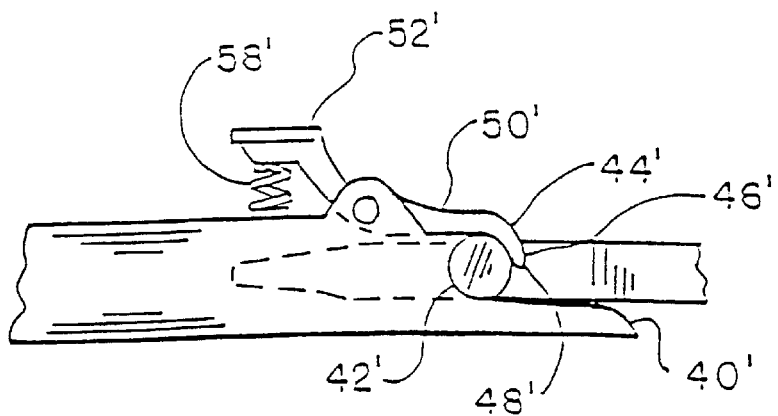
FIG. 6 is a side view of a portion of the food serving utensil shown in FIGS. 4 and 5.

FIGS. 4–6 show another embodiment of a food utensil 10' made in accordance with the present invention. Utensil 10' includes a utensil portion (not shown) such as a spoon shaped utensil 12 attached to one end of a square cross-sectional shaped shank 14'. A tapered coupling 16' having a tapered surface 18' is included at the opposite end of the shank 14'. Two locking pins 24' extend transversely from the shank 14'. A splash guard 25' is provided on the shank forwardly of the pins 24' towards the utensil portion. The utensil portion, shank 14', tapered surface 18' and locking pins 24' form a first portion 26'.

A handle 30' is provided similar to that of handle 30. The handle includes a handle grip 32' having an open end 34'. A substantially rectangular shaped cavity 38' is defined at the open end 34' and is adapted to receive the tapered coupling 16'. A lip 40' extends from the open end 34' and has two surfaces 42' adapted to abut against the pins 24'.

A spring loaded clamp 44' is pivotally secured to the handle grip 32'. The clamp 44' is similar to clamp 44 and includes a forked end 46' defined by two spaced apart tines 48' secured to one end of a clamp body 50'. A lever actuator button 52' is secured on an opposite end of the body 50'. The body 50' is pivotally secured to the handle 30' in the same manner as body 50 is secured to handle 30. A spring 58' is secured to the lever actuator button 52' and the handle 30' so as to spring bias tines 48' towards lip 40'.

The utensil 10' operates in the same manner as utensil 10. Specifically, a customer pushes down on button 52' and moves the handle 30' towards the coupling 16' so that it is received in the cavity 38'. The button 52' is then released and the tines 48' contact pins 24', so that the pins 24' are sandwiched between tines 48' and the lip 40'.

The utensil 10' can be used in the same manner as utensil 10, and after the customer finishes taking food, the handle 30' can be removed by depressing button 52' and moving the handle 30' away from the coupling 16'.

Figure 7:
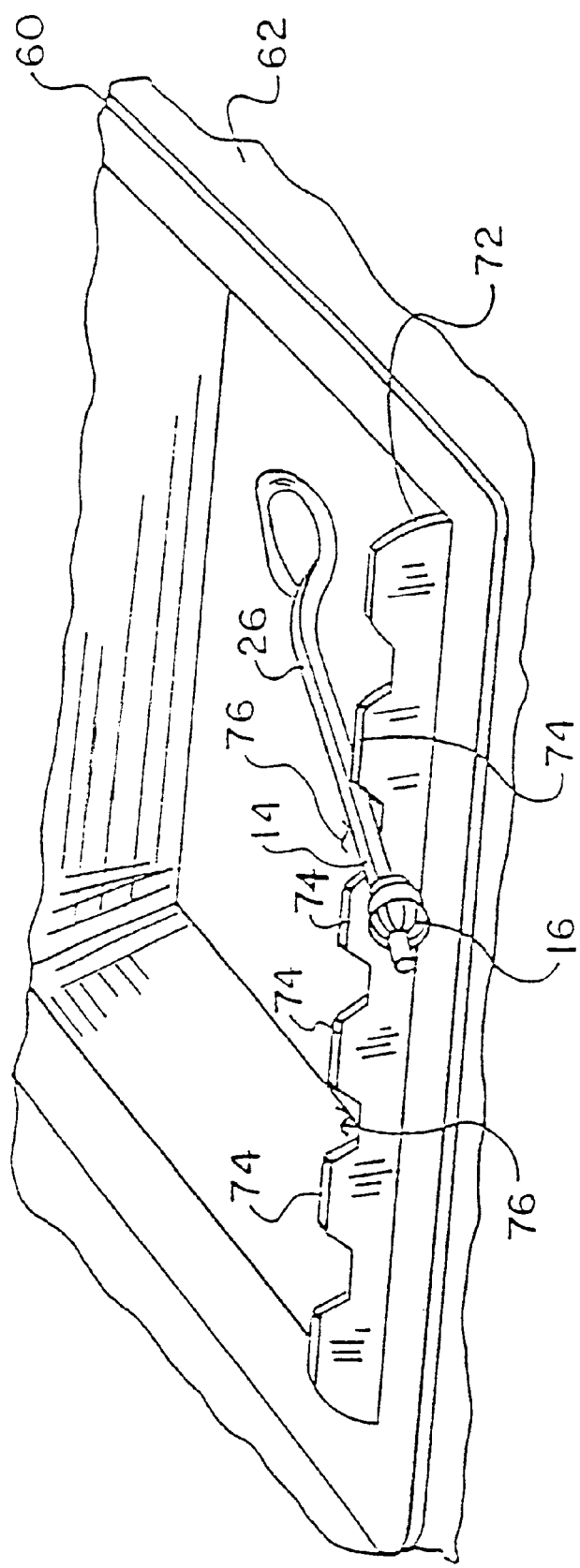
FIG. 7 is a top perspective view showing a holder, buffet dish and utensil first portion shown in FIG. 1 made in accordance with the present invention.

Although, as previously described, the first portion 26 can rest against an upper edge of the dish 60 when it is not secured to a handle 30, there is always a possibility that the first portion 26 can fall into the food 64 contained in the dish 60. To overcome this problem, a holder 72 can be provided as shown in FIG. 7. Holder 72 includes a plurality of spaced tabs 74 defining retaining recesses 76. Holder 72 is adapted to coact with the dish 60, that is it can be secured to the dish 60 by being clipped or welded to the dish, sandwiched between the dish 60 and the table 62 or secured to the table 62 in close proximity to the dish 60. The width of each retaining recess is less than the width W of the splined coupling 16 but greater than the shank width 14. The holder 72 can be removably or permanently attached to the dish 60, and preferably, the holder is made of stainless steel or plastic.

In operation, after the customer uses the utensil 10, then he or she places the shank 14 in any of the retaining recesses 76 so that the utensil portion 12 is positioned within the dish 60. The customer then disengages the handle 30 and removes it from the first portion 26 as previously discussed. The next customer who desires food 64 from the dish 60 engages his or her handle 30 with the splined coupling 16. During engagement, the smooth frusto-conical portion 18 of the splined coupling 16 abuts against the adjacent tabs 74 to assist engagement of the handle 30. The tabs 74 prevent the first portion 26 from falling within the food 64 during this process. After the customer takes his or her food 64 from the dish 60, then the customer disengages the handle 30 from the first portion 26 as previously discussed. The holder can also be used with the second utensil 10'.

Figure 8:
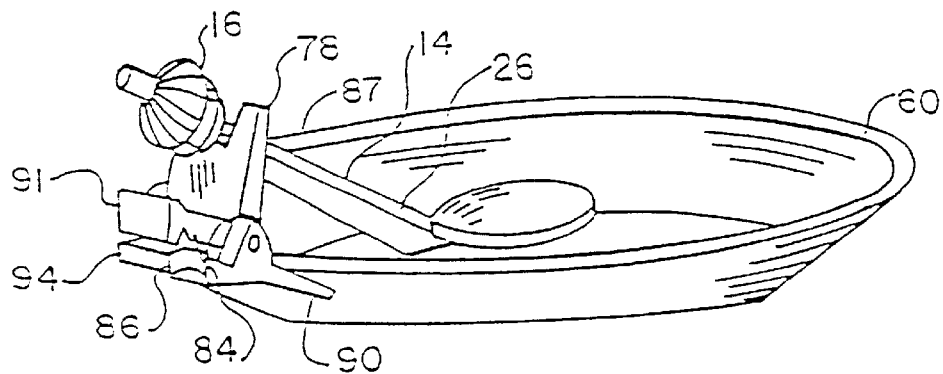
FIG. 8 is a top perspective view of a clip, a buffet dish and a utensil first portion as shown in FIG. 1 made in accordance with the present invention.
Figure 9:
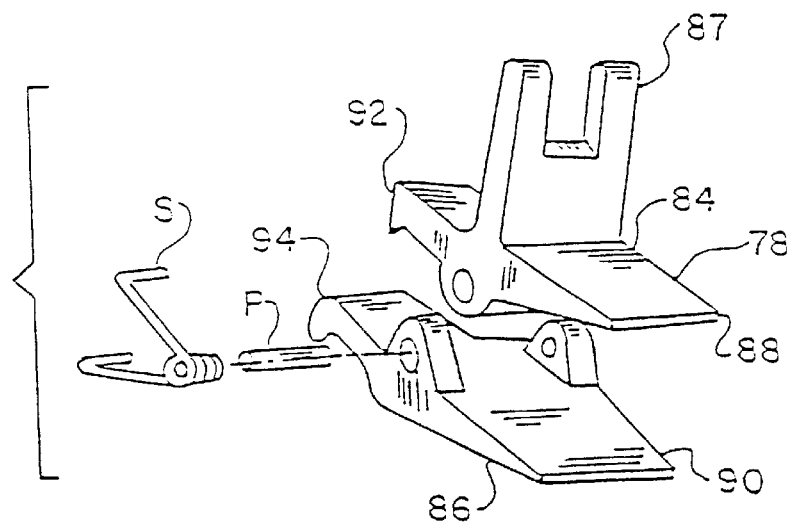
FIG. 9 is an exploded view of the clip shown in FIG. 8.

Alternatively, the buffets can be provided with utensil retaining clips 78, 80, 82, 102, 104 and 106. As shown in FIGS. 8 and 9, clip 78 includes an upper half 84 and a lower half 86. The upper half includes a utensil support 87 defined by two spaced apart tabs defining a shank receiving recess. A pivot pin P pivotally secures the upper half 84 to the lower half 86. A spring S is received between the upper half 84 and the lower half 86 so as to spring bias forward edges 88 and 90 of the clip 78.

The clip tabs are spaced apart less than the distance W but greater than the diameter of the shank 14. Ends 92 and 94 of clip 78 are adapted to be pushed towards each other by a restaurant worker so that forward edges 88 and 90 are spaced apart. The edges 88 and 90 are then placed over a dish edge as shown in FIG. 8. The ends 92 and 94 are released so that edges 88 and 90 are urged by the spring S in a closed position and contact the dish edge so as to removably secure the clip 78 to the dish 60. The first portion 26 is adapted to rest on the clip 78 and be received between the tabs in the same manner as holder 72. Clip 78 can be manufactured out of metal, such as stainless steel, or plastic.

Figure 10:
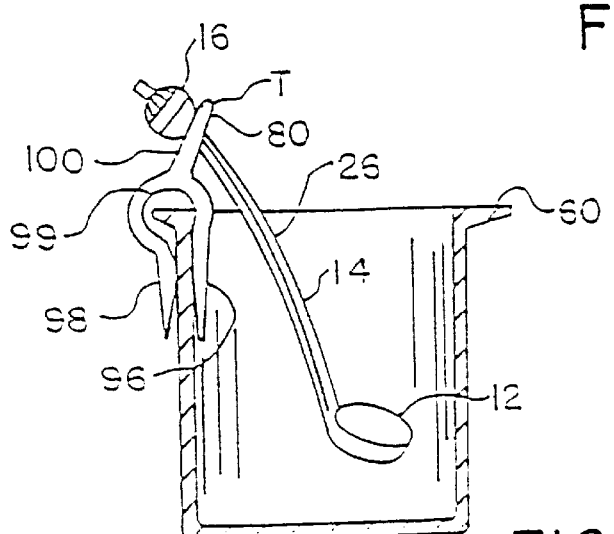
FIG. 10 is a side view partially in section showing a buffet dish, a clip and a utensil first portion made in accordance with the present invention.
Figure 11:
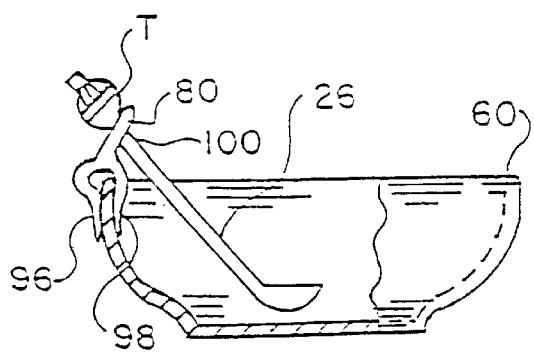
FIG. 11 is a side view partially in section of the clip shown in FIG. 10 with another buffet dish.
Figure 12:
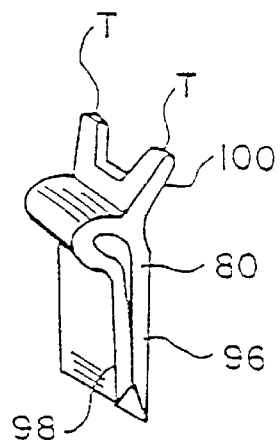
FIG. 12 is a perspective top view of the clip shown in FIGS. 10 and 11.

As shown in FIGS. 10–12 and 15B, clip 80 includes a unitary body having two legs 96 and 98 having an upper portion 100. Upper portion 100 includes two spaced apart tabs T and is similar to utensil support 87. The clip is made of a spring-like material, either plastic or metal, such as stainless steel. The legs 96 and 98 can be sufficiently spread apart to receive an edge of a dish 60 as shown in FIGS. 10 and 11. A recess 99 is defined by upper portions of legs 96 and 98 of the clip 80, which permits the clip 80 to be received by different shaped dish edges. The legs 96 and 98 abut against the dish surface when the clip 80 is engaged with the dish 60. Clip 80 coacts with the utensil 10 in the same manner as clip 78.

Figure 13:
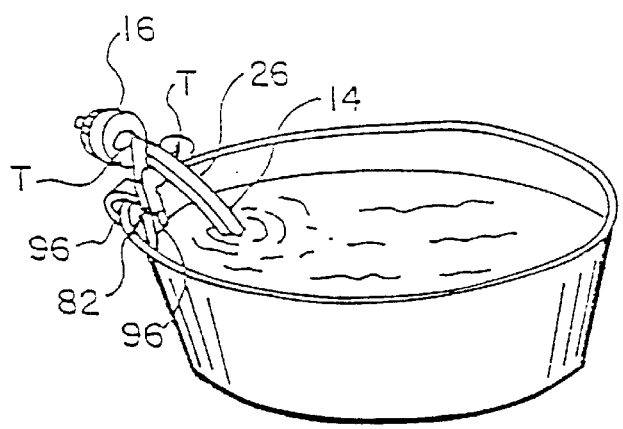
FIG. 13 is a top perspective view of a clip, a buffet dish and a utensil first portion made in accordance with the present invention.
Figure 14:
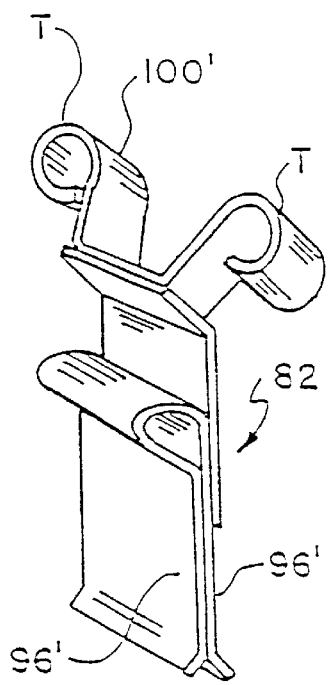
FIG. 14 is a top perspective view of the clip shown in FIG. 13.

As shown in FIGS. 13 and 14, clip 82 is similar to clip 80 and includes two legs 96' and 98' and an upper portion 100'. The upper portion includes two spaced apart tabs T having rolled upper portions. Clip 82 can be made of either plastic or metal. Like clip 80, the clip removably fastens onto the edge of the dish 60 with a portion of the dish 60 sandwiched between legs 96' and 98'.

Figures 15A, 15B, 15C:
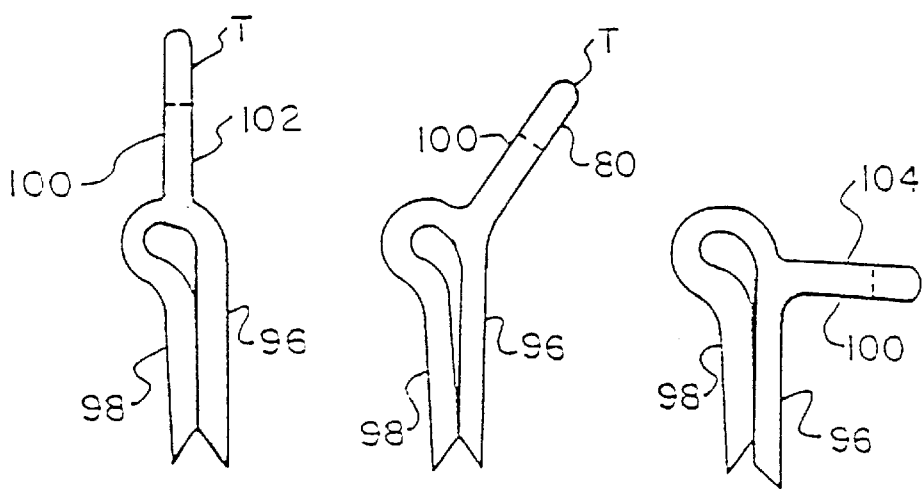
FIG. 15A is a side view of a clip similar to that shown in FIGS. 10–12.
FIG. 15B is a side view of the clip shown in FIGS. 10–12.
FIG. 15C is a side view of a clip similar to the clip shown in FIGS. 10–12.

As shown in FIGS. 15A and 15C, clips 102 and 104 are similar to the clip 80 shown in FIGS. 10–12 and 15B with the exception of the orientation of the upper portion 100.

Figure 16:
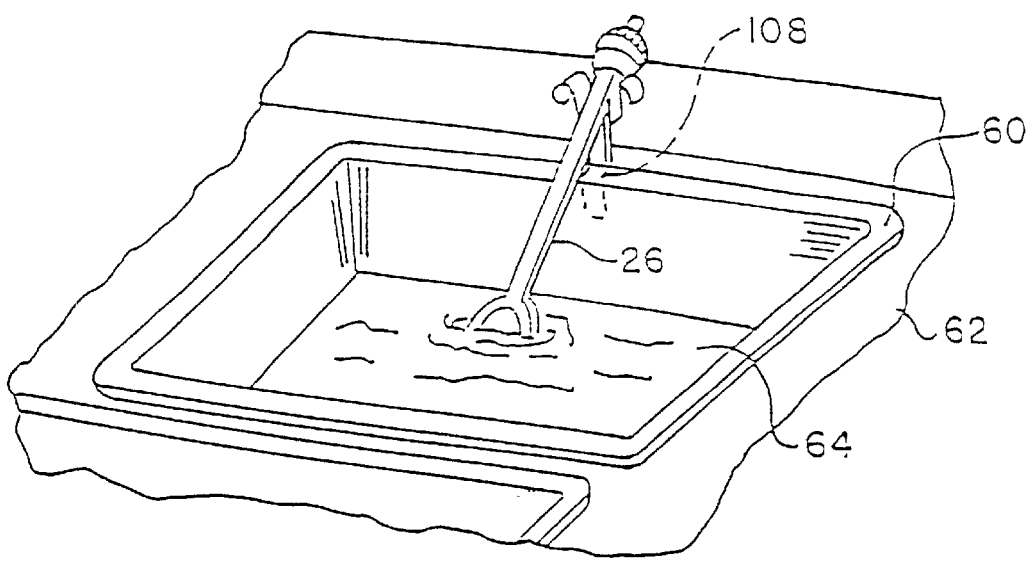
FIG. 16 is a top perspective view of a clip, a buffet dish and a utensil first portion made in accordance with the present invention.
Figure 17:
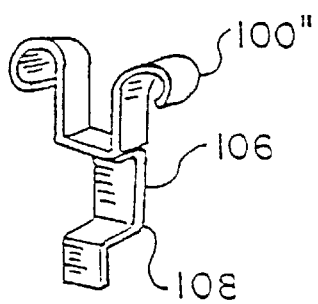
FIG. 17 is a top perspective view of the clip shown in FIG. 16.

FIGS. 16 and 17 show another clip 106 having an upper portion 100" similar to upper portion 100' of clip 82. A lower portion 108 of the clip is adapted to be sandwiched between the dish 60 and the buffet table 62. As shown in FIGS. 14 and 17, clips 82 and 106 are made from various sections which are attached to each other by welding, gluing or fasteners. Also, clips 82 and 106 can be made as one integral piece by injection molding or bending sheet metal.

Figure 18:
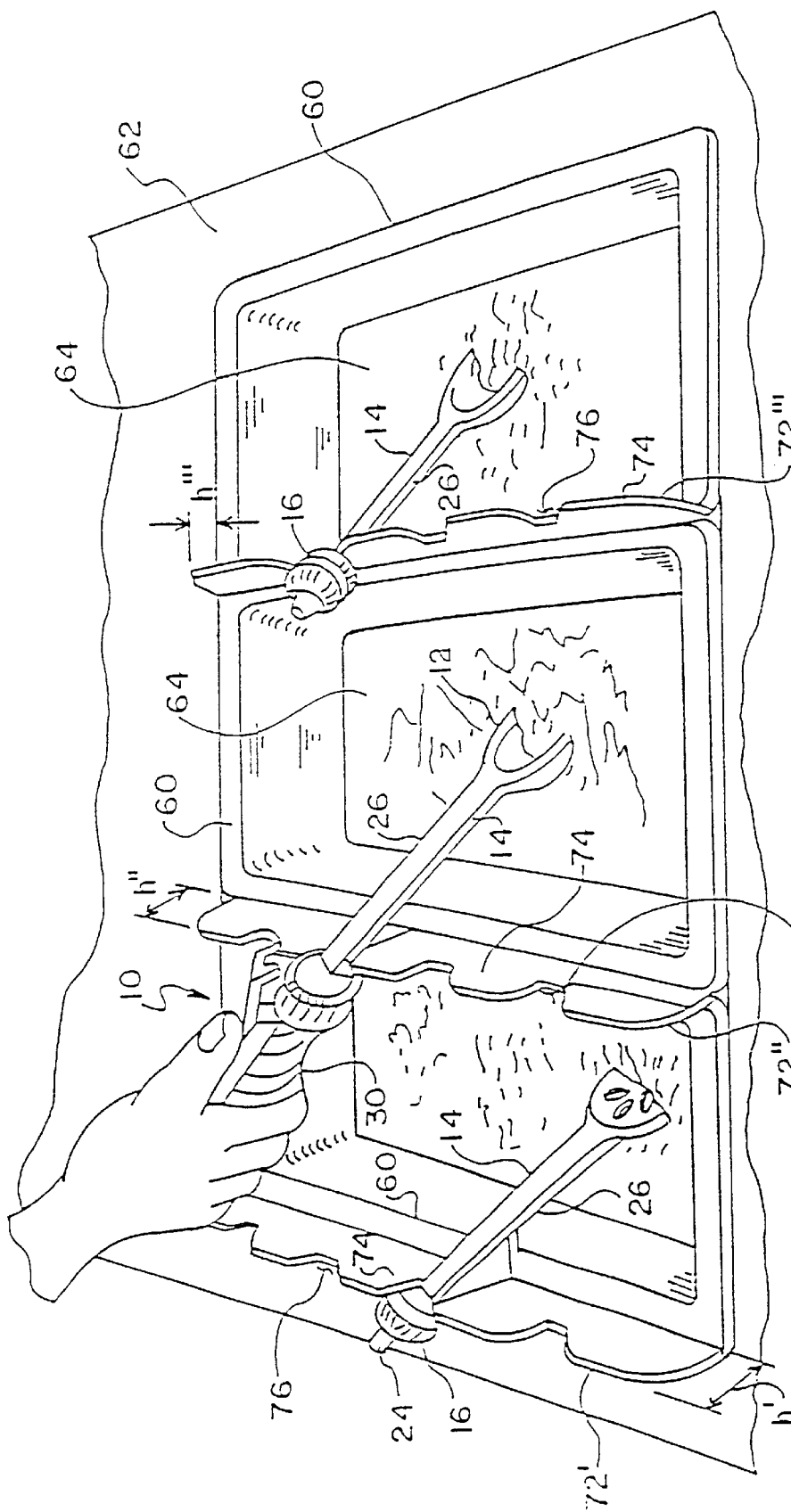
FIG. 18 is a top perspective view of a buffet table, buffet dishes, utensil first portions and utensil first portion holders made in accordance with the present invention.

FIG. 18 shows a buffet table having a plurality of dishes 60 with three holders 72', 72" and 72'" of varying heights h', h" and h'", where h' is greater than h", which is greater than h'". The varying heights of the holders 72 minimizes the chances of inadvertent knocking of the first portions 26 into the dishes 60.

Figure 19:
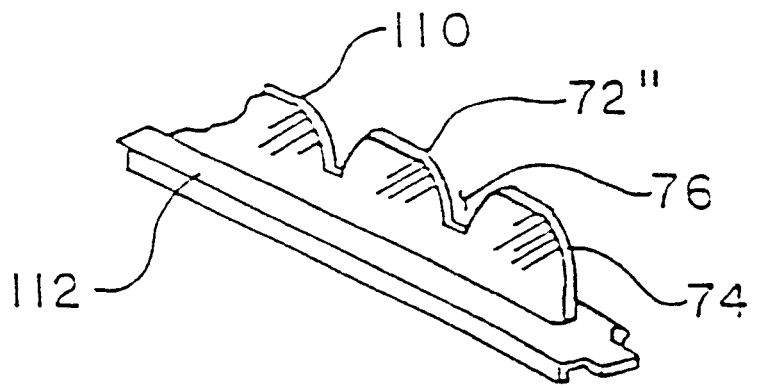
FIG. 19 is a top perspective view of one of the holders shown in FIG. 18.

FIG. 19 shows holder 72" which is similar to holder 72'" which includes an upper portion 110 and a lower portion 112 having two spaced apart legs and a base to which the upper portion is welded.

Figure 20:
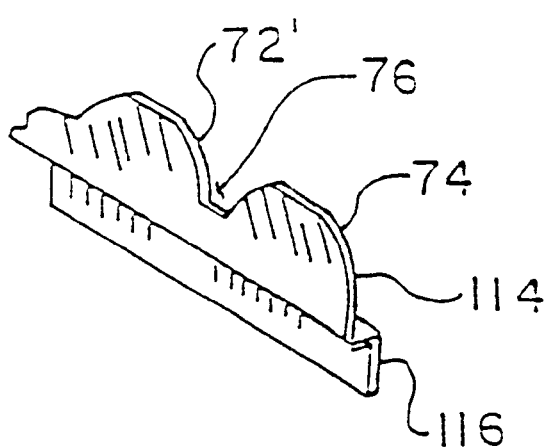
FIG. 20 is a top perspective view of a portion of another one of the holders shown in FIG. 18.

FIG. 20 shows holder 72' including an upper portion 114 and an integral bent portion 116. The holders 72', 72" and 72'" are adapted to be sandwiched between the dishes 60 and table 62.

The holders 72, 72', 72" and 72'" and clips 78, 80 82, 102, 104 and 106 can be used individually or in any combination in conjunction with the buffet table 62 and dishes 60 and utensils 10 and 10'. Preferably, holders are used with dishes 60 containing hot food and clips are used with dishes containing cold food. The holders and clips can be made from plastic or metal, such as stainless steel.

Figure 23:
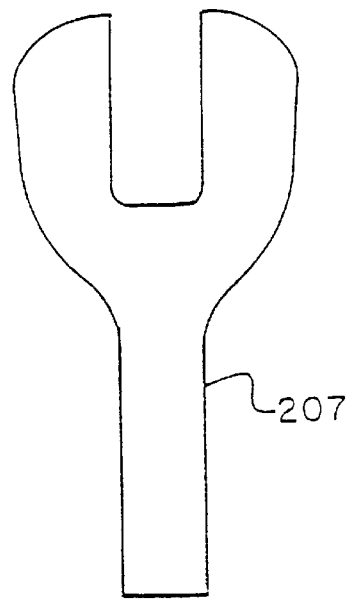
FIG. 23 is a top plan view of a portion of an alternative utensil first portion for the serving utensil shown in FIG. 21.
Figure 24:
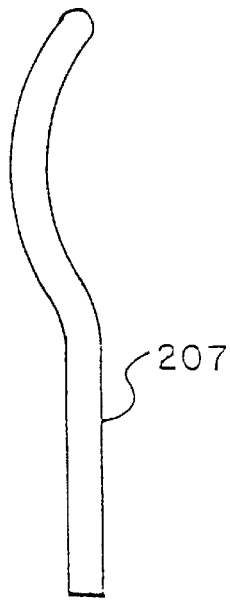
FIG. 24 is a side elevational view of the utensil first portion shown in FIG. 23.
Figure 26:
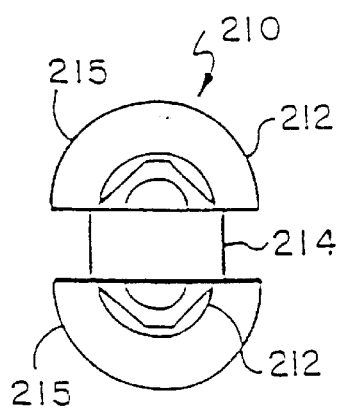
FIG. 26 is a front elevational view of the handle shown in FIGS. 21, 22 and 25.
Figure 25:
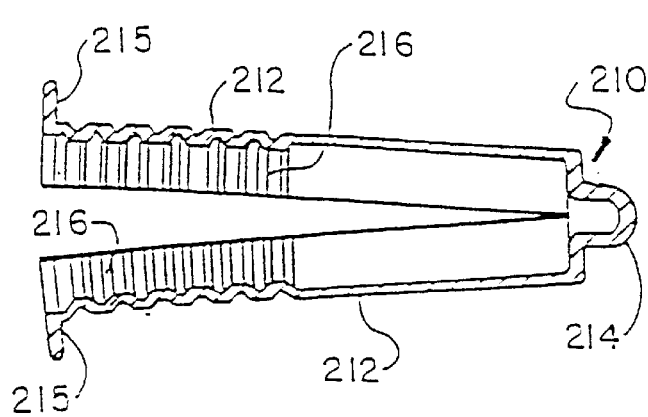
FIG. 25 is a side sectional view of the removable handle shown in FIG. 21.
Figure 35:
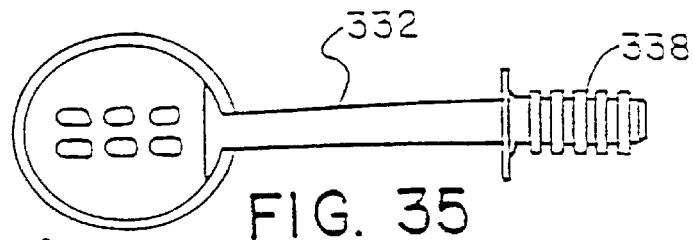
FIG. 35 is a top plan view of another utensil first portion made in accordance with the present invention.
Figure 36:
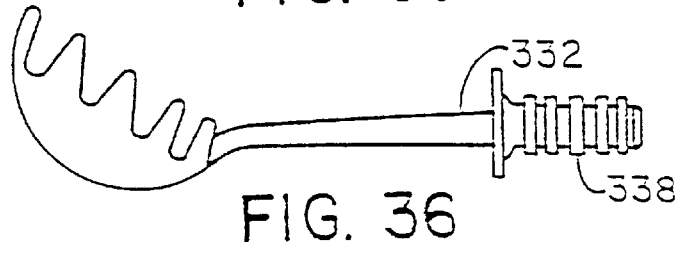
FIG. 36 is a side elevational view of the utensil first portion shown in FIG. 35.
Figure 37:
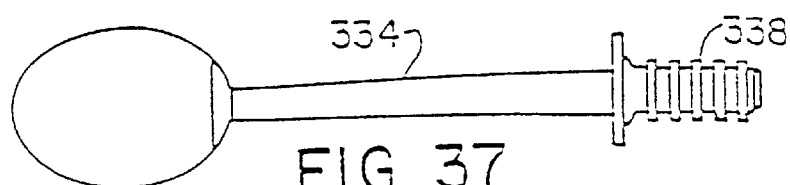
FIG. 37 is a top plan view of another utensil first portion made in accordance with the present invention.
Figure 38:
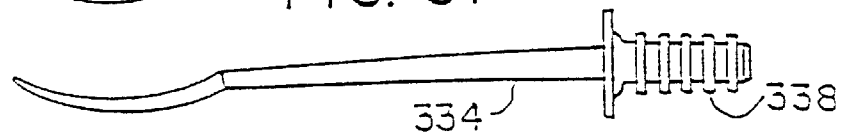
FIG. 38 is a side elevational view of the utensil first portion shown in FIG. 37.
Figure 39:
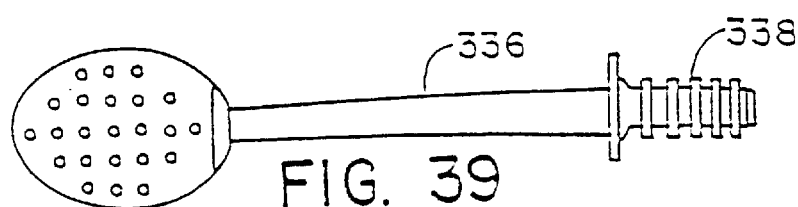
FIG. 39 is a top elevational view of another utensil first portion made in accordance with the present invention.
Figure 40:
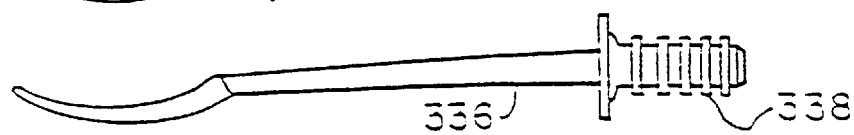
FIG. 40 is a side elevational view of the utensil first portion shown in FIG. 39.

FIGS. 21 and 22 show another embodiment of a buffet utensil 200 made in accordance with the present invention. Utensil 200 includes a utensil first portion 202. The utensil first portion 202 includes a spoon 204 secured to a shank 206. Alternatively, a fork 207 (or any other utensil portion) can replace the spoon 204 as shown in FIGS. 23 and 24. A male portion 208 is defined at an end of the shank 206. A lip 209 is defined at an end of the male portion 208. As shown in FIGS. 21, 23, 25 and 26, a unitary handle portion or second portion or female portion 210 is provided that looks substantially like tongs, i.e., two sections 212 hinged together at a flexible hinge section 214. A lip 215 is defined on each section 212 opposite the hinge section 214. The handle portion 210 is preferably made of plastic, such as polypropylene, and includes gripping surfaces 216 adapted to mate with a gripping surface 218 of the male portion 208 of the shank 206. The utensil portion can be made of plastic, such as nylon 6/6, or metal, such as stainless steel. Preferably, the handle is in an open position, as shown in FIGS. 25 and 26, prior to being received by a patron.

In operation, the handle portion 210 is placed over the male portion 208 of the shank 206 so that lip 209 abuts lips 215. The handle portion 210 is then squeezed so that the gripping surfaces 216 of the handle sections 212 move toward each other and engage with the gripping surface 218 of the male portion 208, thereby forming a buffet utensil 200. After the server completes his or her use of the buffet utensil 200, then he or she loosens their grip from the handle portion 210 so that the handle portion 210 can be removed from the utensil first portion 202.

FIGS. 27 and 28 show another embodiment of a buffet utensil 300 (namely, a tong) made in accordance with the present invention. Tong 300 includes a utensil first portion 302 that includes two sections 304 and 306 secured to each other by a living hinge 308. Each section 304 and 306 includes a spoon 309 secured to a shank 310 having a structural rib 312. A male portion 314 is defined at an end of the shank 310. An end of the male portion 314 is integrally secured to the living hinge 308. Preferably, the living hinge 308 is originally molded in an open position as shown in FIG. 27. Preferably, the utensil portion 302 is made of a plastic material. The living hinge 308 is flexible enough so that when the male portions 314 are squeezed toward each other, the living hinge 308 flexes enough to permit the spoons 309 to move toward each other to a closed position. The utensil portion 302 can be made of plastic, such as nylon 6/6 or polypropylene, or metal, such as stainless steel. The living hinge 308 returns to the open position when the squeezing force is removed.

A unitary handle portion or second portion or female portion 316 is provided. The unitary handle portion 316, as shown in FIG. 27, includes two sections 318 hinged at a flexible hinge or living hinge section 320. Unitary handle 316 is similar to unitary handle portion 210 with the exception of the shape of the hinge sections 214 and 320. The unitary handle portion 316 is made of plastic, such as polypropylene. Gripping surfaces 322 are provided and adapted to mate with gripping surfaces 324 of the sections 304 and 306 of the male portion 314 of the shank 310.

In operation, the unitary handle portion 316 is placed over the male portions 314 of sections 304 and 306 of the shanks 310. The unitary handle sections 318 are then squeezed and forced toward each other so that the gripping surfaces 322 of the handle portion engage with the gripping surfaces 324 of the male portions 314, thereby forcing the spoons 309 toward each other in a tong-like fashion so that food, such as salad, can be received between the spoons 309. Then, slightly releasing the squeezing force applied to the unitary handle sections 318 will cause the spoons 309 to move away from each other to an open position due to the living hinge 308. This arrangement thereby forms a buffet utensil. After the server completes his or her use of the buffet utensil or tong 300, then he or she loosens their grip from the unitary handle portion 316 so that the unitary handle portion 316 can be removed from the utensil first portion 302.

FIGS. 29–40 show various utensils for use with the unitary handle portions 210 or 316 shown in FIGS. 25–27. FIGS. 29 and 30 show a spatula 326. Other buffet utensil first portions having a variety of utensil portions 328 (spoon), 330 (fork), 332 (fork), 334 (spatula) and 336 (spatula) are shown in FIGS. 31–40. Each of the utensil portions include a shank having male portions 338 as previously discussed.

FIGS. 41 and 42 show a utensil first portion 340 that includes a soup ladle 342 secured to a shank 344. As shown in FIGS. 43–46, the shank 344 includes a distal end 346 that is received by a recess 348 formed in the soup ladle 342. A male portion 350 is defined at an end 352 of the shank 344. A lip 355 is provided at an end of the male portion 350. As shown in FIG. 41, the unitary handle or second portion 210 coacts with the male portion 350 to form a buffet utensil. The utensil first portion 340 can be made of plastic, such as nylon 6/6, or metal, such as stainless steel.

In operation, the handle sections 212 of the unitary handle portion 210 is placed over the male portion 350 of the shank 344. The handle sections 212 are then squeezed so that the gripping surfaces 216 of the unitary handle portion 210 engage with gripping surfaces 354 of the male portion 350, thereby forming a buffet utensil 356. After the server completes his or her use of the buffet utensil 356, then he or she loosens their grip from the unitary handle portion 210 so that the handle portion 210 can be removed from the utensil first portion 340.

Figure 47:
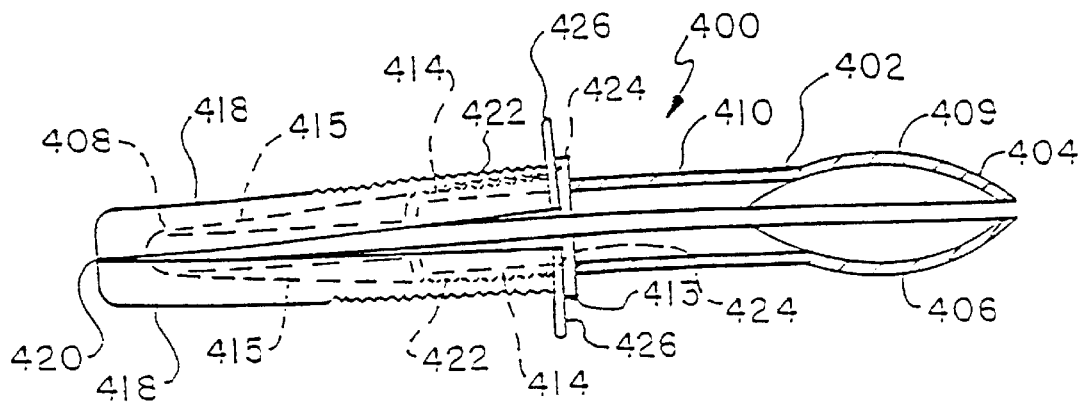
FIG. 47 is a side elevational view partially in section of a food serving utensil in a closed position having a removable handle and a utensil first portion made in accordance with another embodiment of the present invention.

FIGS. 47–52 show another embodiment of a buffet utensil 400 (a tong) made in accordance with the present invention. Tong 400 includes a utensil first portion 402 that includes two sections 404 and 406 secured to each other by a living hinge 408. Each section 404 includes a spoon 409 secured to a shank 410. A lip 413 and a male portion 414 are defined on an intermediate portion of the shank 410. A structural rib 415 extends from the male portion 414 to the living hinge 408. Preferably, the utensil first portion 402 is made of plastic material. The living hinge 408 is flexible enough so that when male portions 414 are squeezed toward each other, the living hinge 408 flexes enough to permit the spoons 409 to be moved toward each other to a closed position as shown in FIG. 47. The utensil first portion 402 can be made of plastic, such as nylon 6/6 or polypropylene, or metal, such as stainless steel. The living hinge 408 returns to the open position when the squeezing force is removed. The plastic utensil first portion 402 can be molded as one piece or made from a plurality of pieces ultrasonically welded together.

Figure 49:
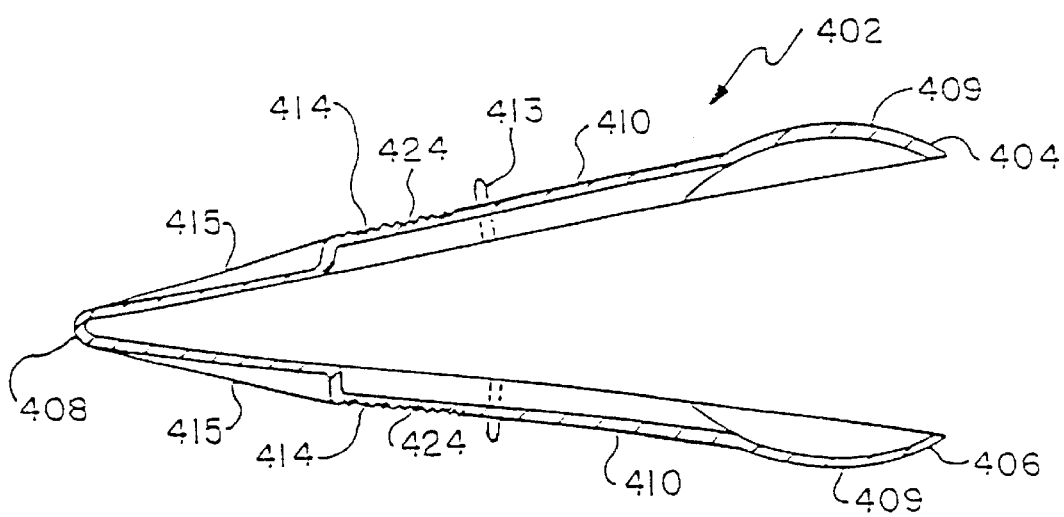
FIG. 49 is a section taken along lines XLIX—XLIX of FIG. 48.
Figure 48:
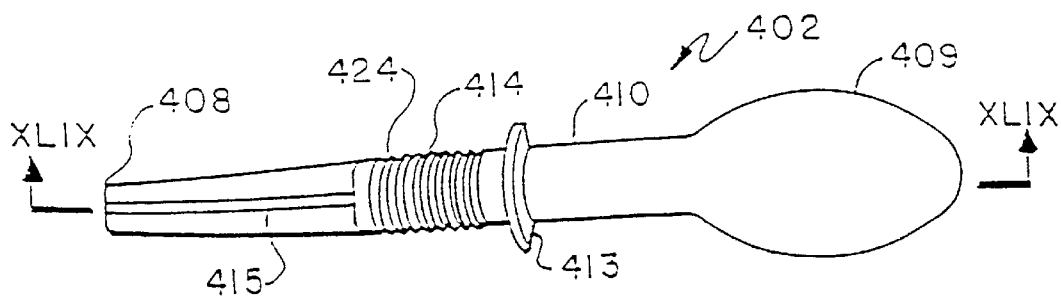
FIG. 48 is a top plan view of a utensil first portion of the utensil shown in FIG. 47.
Figure 58:
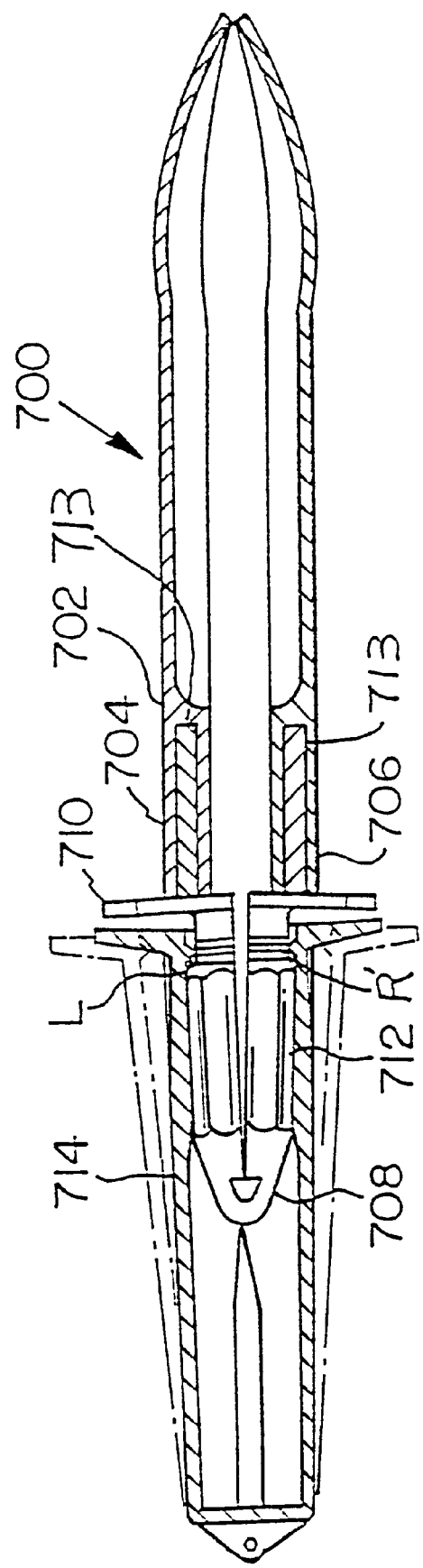
FIG. 58 is a side elevational view partially in section of a food service utensil similar to the food utensil shown in FIG. 47 made in accordance with the present invention.

First portion 402 and first portion 702 are unitary or integral portions of the embodiments of the buffet utensils as shown in FIGS. 49 and 58.

A unitary handle portion or second portion or female portion 416 is provided. The unitary handle portion 416 is shown in FIGS. 47, 50, 51 and 52, which includes two sections 418 hinged at a flexible hinge or a living hinge 420. The unitary handle portion 416 is made of plastic, such as polypropylene. The plastic unitary handle portion 416 can be molded as one piece or made from a plurality of pieces ultrasonically welded together, such as at the flexible hinge 420. Gripping surfaces 422 are provided and adapted to mate with gripping surfaces 424 of sections 404 and 406 of the male portion 414 of the shank 410. A lip 426 is defined on a forward end of each section 418.

In operation, the unitary handle portion 416 is placed over the male portions 414 of sections 404 and 406 of the shank 410 so that lips 426 abut respective lips 413 as shown in FIG. 50. In a closed position, as shown in FIG. 47, the sections 418 of the unitary handle portion 416 are squeezed and forced toward each other so that the gripping surfaces 422 of the handle portion engage the gripping surfaces 424 of the male portion 414, thereby forcing the spoons 409 toward each other in a tong-like fashion so that food, such as salad, can be received between the spoons 409. As shown in FIG. 50, slightly releasing the squeezing force applied to the sections 418 will cause the spoons 409 to move away from each other to an open position due to the living hinge 420. This arrangement thereby forms a buffet utensil. After the server completes his or her use of the buffet utensil or tong 400, then he or she loosens their grip from the unitary handle 416 so that the unitary handle portion 416 can be removed from the utensil first portion 402.

In other words, each of the sections 418 of unitary handle portion 416 have free or distal ends, namely, lips 426 as shown in FIGS. 47 and 50. Living hinge 420 biases sections 418 to an open position as shown in FIG. 50. When a squeezing force is applied to the sections 418, the lips 426, or distal ends of the utensil handle portion 416, move toward one and other. When the utensil handle portion 416 is placed over the utensil first portion 402 and such a squeezing force is applied the buffet utensil 400 is moved to a closed position as shown in FIG. 47.

The male portions of the previously described utensil first portions can be modified so that the male portions can be received by the unitary handle portion 416. Further, in operation, the unitary handles can be disposed of or resanitized for future use after the patron passes through the buffet table. The lips as disclosed on the previously described utensil first portions are adapted to coact with holder 72 and clips 78, 80, 82, 102, 104 and 106 in a similar manner as splined coupling 16 coacts with these elements. Specifically, the lip diameter is greater than the spacing between respective tabs of the holder 72 and the above-identified clips. Preferably the unitary handle portions 210, 316 and 416 are formed in an open position before a patron squeezes the handle to a closed position to engage with a respective utensil portion. Preferably, the respective hinges should act like springs so as to urge or bias the handle portions in an open position, such as shown in FIGS. 21, 22, 25, 26, 27 and 50. Alternatively, a'spring member can be incorporated in the unitary handle portions to maintain the unitary handle portions in an open position. Although it is preferable that the handle portions be a unitary design, they can also be formed by several components.

FIG. 53 shows a disposable plastic mitt 500 made in accordance with the present invention. The mitt 500 includes a thumb portion 502 and a finger portion 504 and is made of a polymeric or plastic material. In operation, the restaurant patrons initially places at least one mitt over their serving hand prior to entering a buffet line. The patron uses the mitted hand to grab handles of respective utensils, such as described herein. After the patron passes through the buffet line, the mitt 500 is discarded. More specifically, a buffet table having a plurality of buffet dishes for containing food and a plurality of food utensils, each including a utensil portion and a handle are provided. Food is placed in the buffet dishes. Utensils are provided for each buffet dish. The buffet patron places a mitt on their hand. The patron then grabs a utensil handle using their mitted hand and then removes food contained within the buffet dish using the utensil portion. The patron then places the food from the utensil portion onto the plate and releases the utensil. An advantage of the mitt over the prior art described glove is that one size can fit all patrons, the mitt is easier to manufacture and costs less to manufacture and a hand can be placed in a mitt much easier than in a glove, especially where the patron has arthritis.

FIGS. 54–57 show yet another embodiment of a buffet utensil 600 made in accordance with the present invention. Utensil 600 includes a utensil first portion 602. The utensil first portion 602 includes a perforated spoon 604 secured to a shank 606. Alternatively, a fork (or any other utensil) can replace the spoon 604. A male portion 608 is defined at an end of the shank having a plurality of longitudinally extending flat sections 605 forming a prismatic shape or portion P whose cross-section is an octagon. The male portion can include any number of longitudinal extending sections and the cross-section can be other geometric shapes. A lip or stop 609 is defined at one end of the male portion 608 and includes an orientation notch N. A recessed area R is defined between the lip 609 and the plurality of longitudinally extending flat sections 605. The lip or stop 609 is adapted to rest against an outer surface of a buffet dish 60. A unitary handle portion or second portion or female portion 610 is provided that looks substantially like tongs, i.e., two sections 612 hinged together at a flexible spring-like hinge 614 which is adapted to urge or bias the two sections 612 away from each other when the sections 612 are not squeezed by a user. A lip 615 having a notch N, is provided on each section 612 opposite the hinge section 614. A lip member L extends from each section 612. The handle portion 610 is preferably made of plastic, such as polypropylene, and includes a plurality of flat longitudinally extending surfaces or gripping surfaces 616 adapted to mate with or abut against longitudinal flat sections 605 of the male portion of the shank 606. The plastic handle portion 610 can be molded as one piece or molded as two pieces and ultrasonically welded at the hinge section 614. Alternatively, the lip members L can be made of a plurality of circumferentially spaced apart segments. The utensil portion can be made of plastic, such as nylon 6/6, or metal, such as stainless steel. Preferably, the handle is in an open position prior to being received by a patron.

In operation, the handle portion 610 is placed over the male portion 608 of the shank 606 so that lip 609 abuts lip 615 and notches N and N' are aligned. Alignment of the notches N and N' insures a proper orientation of the utensil for dispensing food. Other types of indicia can be provided for aligning the utensil for dispensing food. The handle portion 610 is then squeezed so that the flat longitudinally extending surfaces 616 of the sections 612 move toward each other and engage with or abut the longitudinally extending flat sections 605 of the male portion 608 thereby forming a buffet utensil 600. The engaged flat longitudinally extending surfaces 616 and longitudinally extending flat sections 605 prevent rotation of the utensil first portion 602 relative to the handle portion 610 about the longitudinal "X" axis. Also during engagement of the handle portion 610 with the utensil first portion 602, the lip members L are received within the recess R limiting the movement of handle portion 610 relative to the utensil first portion 602 along the longitudinal "X" axis because of interference with either the lip 609 or the prismatic portion P. Alternatively, a plurality of annular grooves shown in phantom as R' can be provided for engagement with lip members L to prevent movement of the handle portion 610 relative to the utensil first portion 602 along the "X" axis. After the server completes his or her use of the buffet utensil 600, then he or she loosens their grip from the handle portion 610 so that the handle portion 610 can be removed from the utensil first portion 602. Like the previously described handle portions, handle portion 610 can be disposed of or resanitized.

FIG. 58 shows another embodiment of a buffet utensil 700 (a tong) similar to the tong shown in FIGS. 47–52 made in accordance with the present invention. The tong 700 includes a first portion 702 made of plastic that includes two sections 704 and 706 secured to each other by a living hinge 708. A lip 710 and male portion 712 are provided at one end. The lip includes an orientation notch N (not shown) as previously described.

The lip 710 and male portion 712 are ultrasonically welded to the two sections 704 and 706 through sections 713. A unitary handle portion or female portion 714 is provided and is the same as the handle portion 610 as previously described. The buffet utensil 700 operates in the same manner as the tongs 400 and, therefore, will not be described with the exception of the alignment of notches N and N' (not shown) and the engagement of the lip members L with grooves R' defined on the male portion 712 as previously described with respect to the buffet utensil 600.

Various modifications can be made to the subject invention and fall within the scope of the following claims.

I claim:

1. A utensil, comprising:

a unitary utensil portion for serving food, said utensil portion including two sections hinged together;

each of said sections includes a shank having a first and second end, said utensil portion attached to a respective shank first end; and a handle removably engageable to said shank second ends during use of the utensil, said handle including two sections hinged together.

2. A utensil, comprising:

a utensil portion for serving food, said utensil portion including two sections hinged together;

each of said sections includes a shank having a first and second end, said utensil portion attached to a respective shank first end;

a lip extending from said shank positioned between said shank first end and said shank second end; and a handle removably secured to said shank second ends, said handle including two sections hinged together.

3. A utensil, comprising:

a unitary utensil portion for serving food, said utensil portion including two sections hinged together;

each of said sections includes a shank having a first and second end, said utensil portion attached to respective shank first end; and a handle removably engageable to said shank second ends, said handle including two sections, each section having a distal end, said sections hinged together and said section distal ends spaced apart, wherein said section distal ends are movable towards one another, whereby said utensil portion is moved to a closed position by applying a force to said handle to move said distal ends toward one another.

* * * * *